(12) United States Patent
Comrie

(10) Patent No.: US 8,150,776 B2
(45) Date of Patent: Apr. 3, 2012

(54) METHODS OF OPERATING A COAL BURNING FACILITY

(75) Inventor: Douglas C Comrie, Stow, OH (US)

(73) Assignee: NOx II, Ltd., Port Clinton, OH (US)

( * ) Notice: Subject to any disclaimer, the term of this patent is extended or adjusted under 35 U.S.C. 154(b) by 1170 days.

(21) Appl. No.: 11/652,249

(22) Filed: Jan. 11, 2007

(65) Prior Publication Data
US 2007/0168213 A1   Jul. 19, 2007

Related U.S. Application Data

(60) Provisional application No. 60/759,908, filed on Jan. 18, 2006, provisional application No. 60/760,425, filed on Jan. 19, 2006.

(51) Int. Cl.
*G06Q 10/00* (2006.01)
(52) U.S. Cl. .......................... 705/308; 705/1.1; 502/435
(58) Field of Classification Search ............... 705/1, 1.1, 705/308; 620/622, 627; 502/435
See application file for complete search history.

(56) References Cited

U.S. PATENT DOCUMENTS

| | | | |
|---|---|---|---|
| 174,348 A | 3/1876 | Brown |
| 202,092 A | 4/1878 | Breed |
| 208,011 A | 9/1878 | Eaton |
| 224,649 A | 2/1880 | Child |
| 229,159 A | 6/1880 | McCarty |
| 298,727 A | 5/1884 | Case |
| 346,765 A | 8/1886 | McIntyre |
| 347,078 A | 8/1886 | White |
| 367,014 A | 7/1887 | Wandrey et al. |
| 537,998 A | 4/1895 | Spring et al. |
| 541,025 A | 6/1895 | Gray |
| 625,754 A | 5/1899 | Garland |
| 647,622 A | 4/1900 | Vallet-Rogez |
| 685,719 A | 10/1901 | Harris |
| 688,782 A | 12/1901 | Hillery |

(Continued)

FOREIGN PATENT DOCUMENTS

CA   2026056   3/1992

(Continued)

OTHER PUBLICATIONS

Anonymous "Controlling Mercury Emissions From Coal-Fired Power Plants Using TEXCON", Hazardous Waste Consultant, Aspen Publishers, 2003, vol. 21, Iss. 6; p. A13.*

(Continued)

*Primary Examiner* — Janice A. Mooneyham
*Assistant Examiner* — Heidi Riviere
(74) *Attorney, Agent, or Firm* — Harness, Dickey & Pierce P.L.C.

(57) ABSTRACT

Methods involve adding sorbent components, such as calcium oxide, alumina, and silica, as well as optional halogens as part of environmental control. Use of the sorbents leads to significant reductions in sulfur and mercury emissions that otherwise would result from burning coal. Use of the sorbents leads to production of waste coal ash that, while higher in mercury, is nevertheless usable as a commercial product because the mercury in the ash is non-leaching and because the coal ash has a higher cementitious nature by virtue of the increased content of the sorbent components in the ash. Thus, the methods involve adding powders having qualities that lead to the production of a cementitious coal ash while at the same time reducing emissions from a coal burning facility.

28 Claims, 2 Drawing Sheets

U.S. PATENT DOCUMENTS

| | | |
|---|---|---|
| 700,888 A | 5/1902 | Battistini |
| 744,908 A | 11/1903 | Dallas |
| 846,338 A | 3/1907 | McNamara |
| 894,110 A | 7/1908 | Bloss |
| 896,876 A | 8/1908 | Williams |
| 911,960 A | 2/1909 | Ellis |
| 945,331 A | 1/1910 | Koppers |
| 945,846 A | 1/1910 | Hughes |
| 1,112,547 A | 10/1914 | Morin |
| 1,167,471 A | 1/1916 | Barba |
| 1,167,472 A | 1/1916 | Barba |
| 1,183,445 A | 5/1916 | Foxwell |
| 1,788,466 A | 1/1931 | Lourens |
| 1,984,164 A | 12/1934 | Stock |
| 2,016,821 A | 10/1935 | Nelms |
| 2,059,388 A | 11/1936 | Nelms |
| 2,089,599 A | 8/1937 | Crecelius |
| 2,511,288 A | 6/1950 | Morrell et al. |
| 3,194,629 A | 7/1965 | Dreibelbis et al. |
| 3,288,576 A | 11/1966 | Pierron et al. |
| 3,437,476 A | 4/1969 | Dotson et al. |
| 3,599,610 A | 8/1971 | Spector |
| 3,662,523 A | 5/1972 | Revoir et al. |
| 3,725,530 A | 4/1973 | Kawase et al. |
| 3,764,496 A | 10/1973 | Hultman et al. |
| 3,823,676 A | 7/1974 | Cook et al. |
| 3,838,190 A | 9/1974 | Birke et al. |
| 3,849,267 A | 11/1974 | Hilgen et al. |
| 3,849,537 A | 11/1974 | Allgulin |
| 3,956,458 A | 5/1976 | Anderson |
| 3,961,020 A | 6/1976 | Seki |
| 3,974,254 A | 8/1976 | de la Cuadra Herra et al. |
| 4,040,802 A | 8/1977 | Deitz et al. |
| 4,075,282 A | 2/1978 | Storp et al. |
| 4,094,777 A | 6/1978 | Sugier et al. |
| 4,101,631 A | 7/1978 | Ambrosini et al. |
| 4,115,518 A | 9/1978 | Delmon et al. |
| 4,148,613 A | 4/1979 | Myers |
| 4,174,373 A | 11/1979 | Yoshidi et al. |
| 4,196,173 A | 4/1980 | deJong et al. |
| 4,226,601 A | 10/1980 | Smith |
| 4,233,274 A | 11/1980 | Allgulin |
| 4,272,250 A | 6/1981 | Burk, Jr. et al. |
| 4,280,817 A | 7/1981 | Chauhan et al. |
| 537,926 A | 12/1981 | Wen et al. |
| 4,305,726 A | 12/1981 | Brown, Jr. |
| 4,322,218 A | 3/1982 | Nozaki |
| 4,377,599 A | 3/1983 | Willard, Sr. |
| 4,387,653 A | 6/1983 | Voss |
| 4,394,354 A | 7/1983 | Joyce |
| 4,440,100 A | 4/1984 | Michelfelder et al. |
| 4,472,278 A | 9/1984 | Suzuki |
| 4,474,896 A | 10/1984 | Chao |
| 4,519,807 A | 5/1985 | Nishino et al. |
| 4,519,995 A | 5/1985 | Schroefelbauer et al. |
| 4,555,392 A | 11/1985 | Steinberg |
| 4,582,936 A | 4/1986 | Ashina et al. |
| 4,602,918 A | 7/1986 | Steinberg et al. |
| 4,629,721 A | 12/1986 | Ueno |
| 4,693,731 A | 9/1987 | Tarakad et al. |
| 4,716,137 A | 12/1987 | Lewis |
| 4,741,278 A | 5/1988 | Franke et al. |
| 4,758,418 A | 7/1988 | Yoo et al. |
| 4,764,219 A | 8/1988 | Yan |
| 4,786,483 A | 11/1988 | Audeh |
| 4,804,521 A | 2/1989 | Rochelle et al. |
| 4,807,542 A | 2/1989 | Dykema |
| 4,824,441 A | 4/1989 | Kindig |
| 4,830,829 A | 5/1989 | Craig, Jr. |
| 4,873,930 A | 10/1989 | Egnese et al. |
| 4,886,519 A | 12/1989 | Hayes et al. |
| 4,892,567 A | 1/1990 | Yan |
| 4,915,818 A | 4/1990 | Yan |
| 4,933,158 A | 6/1990 | Aritsuka et al. |
| 4,936,047 A | 6/1990 | Feldmann et al. |
| 4,964,889 A | 10/1990 | Chao |
| 5,013,358 A | 5/1991 | Ball et al. |
| 5,024,171 A | 6/1991 | Krigmont et al. |
| 5,049,163 A | 9/1991 | Huang et al. |
| 5,116,793 A | 5/1992 | Chao et al. |
| 5,126,300 A | 6/1992 | Pinnavaia et al. |
| 5,137,854 A | 8/1992 | Segawa et al. |
| 5,162,598 A | 11/1992 | Hutchings et al. |
| 5,190,566 A | 3/1993 | Sparks et al. |
| 5,238,488 A | 8/1993 | Wilhelm |
| 5,350,728 A | 9/1994 | Cameron et al. |
| 5,368,617 A | 11/1994 | Kindig |
| 5,409,522 A | 4/1995 | Durham et al. |
| 5,435,980 A | 7/1995 | Felsvang et al. |
| 5,447,703 A | 9/1995 | Baer et al. |
| 5,460,643 A | 10/1995 | Hasenpusch et al. |
| 5,505,746 A | 4/1996 | Chriswell et al. |
| 5,505,766 A | 4/1996 | Chang |
| 5,571,490 A | 11/1996 | Bronicki et al. |
| 5,587,003 A | 12/1996 | Bülow et al. |
| 5,618,508 A | 4/1997 | Suchenwirth et al. |
| 5,635,150 A | 6/1997 | Coughlin |
| 5,659,100 A | 8/1997 | Lin |
| 5,670,122 A | 9/1997 | Zamansky et al. |
| 5,733,516 A | 3/1998 | DeBerry |
| 5,738,834 A | 4/1998 | DeBerry |
| 5,787,823 A | 8/1998 | Knowles |
| 5,810,910 A | 9/1998 | Ludwig et al. |
| 5,897,688 A | 4/1999 | Voogt et al. |
| 5,910,292 A | 6/1999 | Alvarez, Jr. et al. |
| 5,989,506 A | 11/1999 | Markovs |
| 6,024,931 A | 2/2000 | Hanulik |
| 6,083,289 A | 7/2000 | Ono et al. |
| 6,240,859 B1 | 6/2001 | Jones, Jr. |
| 6,258,334 B1 | 7/2001 | Gadkaree et al. |
| 6,372,187 B1 | 4/2002 | Madden et al. |
| 6,375,909 B1 | 4/2002 | Dangtran et al. |
| 6,475,451 B1 | 11/2002 | Leppin et al. |
| 6,521,021 B1 | 2/2003 | Pennline et al. |
| 6,528,030 B2 | 3/2003 | Madden et al. |
| 6,533,842 B1 | 3/2003 | Maes et al. |
| 6,558,454 B1 | 5/2003 | Chang et al. |
| 6,610,263 B2 | 8/2003 | Pahlman et al. |
| 6,613,110 B2 | 9/2003 | Sanyal |
| 6,719,828 B1 | 4/2004 | Lovell et al. |
| 6,732,055 B2 | 5/2004 | Bagepalli et al. |
| 6,737,031 B2 | 5/2004 | Beal et al. |
| 6,746,531 B1 | 6/2004 | Barbour |
| 6,790,420 B2 | 9/2004 | Breen et al. |
| 6,808,692 B2 | 10/2004 | Oehr |
| 6,848,374 B2 * | 2/2005 | Srinivasachar et al. ........ 110/345 |
| 6,878,358 B2 | 4/2005 | Vosteen |
| 6,942,840 B1 | 9/2005 | Broderick |
| 6,953,494 B2 | 10/2005 | Nelson, Jr. |
| 6,962,617 B2 | 11/2005 | Simpson |
| 6,974,564 B2 | 12/2005 | Biermann et al. |
| 6,975,975 B2 | 12/2005 | Fasca |
| 7,468,170 B2 | 12/2008 | Comrie |
| 7,507,083 B2 | 3/2009 | Comrie |
| 7,674,442 B2 | 3/2010 | Comrie |
| 7,758,827 B2 | 7/2010 | Comrie |
| 7,776,301 B2 | 8/2010 | Comrie |
| 2002/0065581 A1 | 5/2002 | Fasca |
| 2002/0114749 A1 | 8/2002 | Cole |
| 2002/0184817 A1 | 12/2002 | Johnson et al. |
| 2003/0088370 A1 | 5/2003 | Bagepalli et al. |
| 2003/0103882 A1 | 6/2003 | Bierman et al. |
| 2004/0003716 A1 | 1/2004 | Nelson, Jr. |
| 2004/0013589 A1 | 1/2004 | Vosteen et al. |
| 2004/0086439 A1 | 5/2004 | Vosteen |
| 2004/0219083 A1 | 11/2004 | Schofield |
| 2005/0039598 A1 | 2/2005 | Srinivasachar et al. |
| 2006/0047526 A1 * | 3/2006 | Boyden et al. .................... 705/1 |
| 2006/0210463 A1 | 9/2006 | Comrie |

FOREIGN PATENT DOCUMENTS

| | | |
|---|---|---|
| CN | 1354230 | 6/2002 |
| CN | 11382657 | 12/2002 |
| CN | 1421515 | 6/2003 |
| DE | 25 48 845 A1 | 5/1976 |
| DE | 19745191 | 4/1999 |

| EP | 0433677 | 11/1990 |
| JP | 10-5537 | 1/1998 |
| JP | 2000-325747 A | 11/2000 |

OTHER PUBLICATIONS

Ghorishi et al., "Simultaneous Control of Hg(O), SO(2), and NO(x) by novel Oxidized calcium-based Sorbents", Journal of the Air and Waste Management Association, Mar. 2002, vol. 52, Iss. 3; p. 273.*

McCoy et al., Full-Scale Mercury Sorbent Injection Testing at DTE Energy's St. Clair Station, Paper #97, DTE Energy, Aug. 30-Sep. 2, 2004.

Sudhoff Presentation: "Anticipated Benefits of the TOXECON Retrofit for Mercury and Multi-Pollutant Control Technology", National Energy Technology Laboratory, pp. 19, Nov. 19, 2003.

TECHNews From the National Energy Technology Laboratory, "DOE Announces Further Field Testing of Advanced Mercury Control Technologies, Six Projects Selected in Round 2 to Address Future Power Plant Mercury Reduction Initiatives", pp. 3, Nov. 5, 2004.

Turner, Jackie; News Release: Texas Genco, EPRI, and URS Corporation Test Innovative Mercury Control Method at Limestone Station, "Technology Aims to Capture More Mercury from Power Plant Exhaust", www.epri.com/corporate/discover_epri/news/2005/011105_mercury.html, pp. 2, Jan. 11, 2005, printed Jan. 20, 2005.

Vosteen et al., "Bromine Enhanced Mercury Abatement Recent Industrial Applications and Laboratory Research", Vosteen Consulting GmbH, Thermal Engineering and Flue Gas Cleaning, pp. 25, May 24 & 25, 2005.

www.entsorgung.bayer.com/index.cfm?PAGE_ID=209, Focus on your success, "Incineration: Taking the heat out of complex waste", pp. 2, Jun. 2, 2005.

www.entsorgung.bayer.com/index.cfmPAGE-ID=301, Focus on your success, "Incineration", pp. 2, Jun. 2, 2005.

* cited by examiner

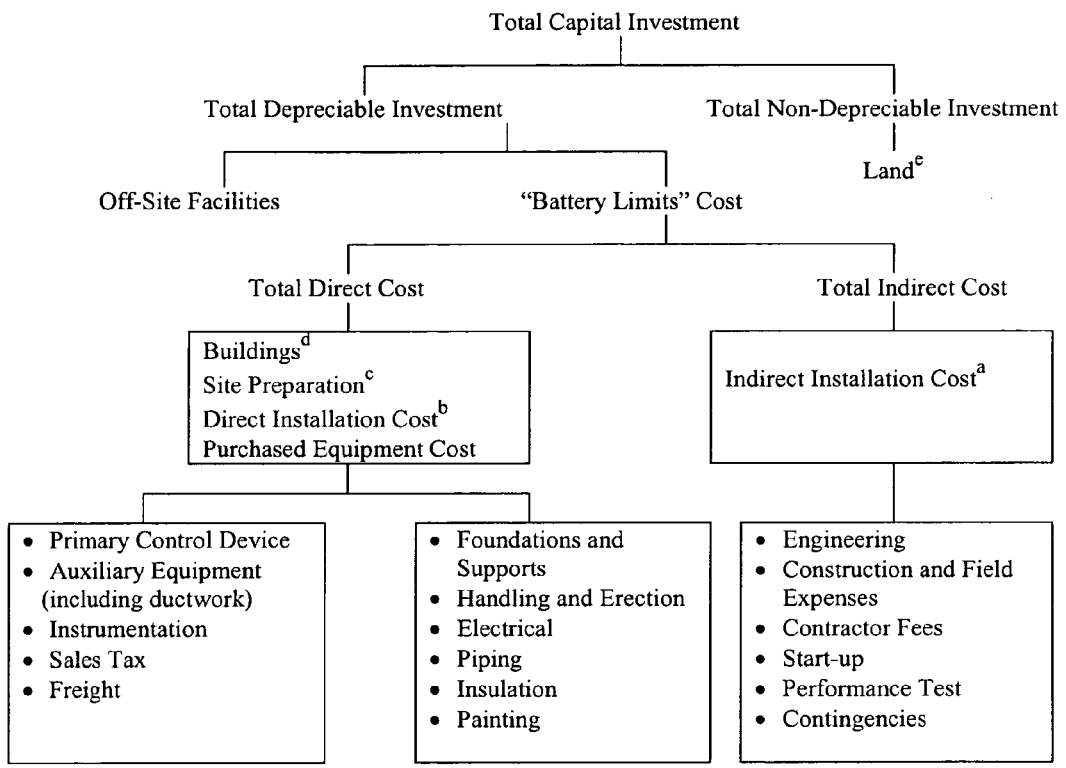

[a] Typically factored from the sum of the primary control device and auxiliary equipment costs.
[b] Typically factored from the purchases of equipment costs.
[c] Usually required only at "grass roots" or "greenfield" installations.
[d] Unlike the other direct and indirect costs, costs for these items usually are not factored from the purchased equipment cost. Rather, they are sized and costedseparately.
[e] Normally not required with add-on control systems.

Figure 1

METHODS OF OPERATING A COAL BURNING FACILITY

CROSS-REFERENCE TO RELATED APPLICATIONS

This application claims the benefit of U.S. Provisional Application No. 60/759,908, filed on Jan. 18, 2006 and U.S. Provisional Application No. 60/760,425, filed on Jan. 19, 2006. The disclosures of the above applications are incorporated herein by reference.

INTRODUCTION

The present teachings relate to methods for operating a coal burning facility. In particular, the present teachings relate to burning coal in the presence of a sorbent or a combination of sorbents that enhance the value of the coal and the balance sheet of the coal burning facility.

Significant coal reserves exist around the world that, according to some estimates, are sufficient to supply the world's energy needs for a hundred years or more. Due to global warming and other concerns, there is a push around the globe to switch to other sources of energy that do not involve burning of fossil fuels. However, alternative sources of energy do not yet exist to replace a significant fraction of the world's use of coal to generate electricity and other power. Especially in countries with fast growing economies, coal is expected to supply a major portion of the world's energy needs into the foreseeable future.

There are significant expenses involved with the use of coal combustion for power generation, and utility operators are constantly searching for ways of operating their business to protect the environment while at the same time increasing the return on investment to their shareholders. The release of sulfur from burning coal leads to acid rain and other environmental problems, while release of mercury leads to environmental and health problems. The levels of sulfur, mercury, and other emissions from coal burning utilities are becoming increasingly a concern for society and are the subject of environmental controls around the world. For example, many societies have capped the release of sulfur from coal burning plants and require coal burning utilities to purchase so-called "pollution credits" on the open market if they exceed those capped levels. Likewise, there is great concern around the world for the adverse health effects of mercury emissions arising from the burning of coal. Societies have justifiably come to the conclusion that such emissions must be minimized or eliminated.

Utility operators such as those that operate coal burning facilities are thus faced with the challenge of continuing to operate to provide an acceptable return on investment while safeguarding the health of the public and the cleanliness of the environment. Thus, operators are faced with high capital costs for the adoption of equipment that will mitigate environmental release of sulfur, mercury, and other such emissions. At the same time, the operators face issues of waste ash disposal, especially if mercury emissions are to be eliminated from the flue gases, the mercury naturally becoming part of the waste ash that must be disposed. Methods of operating such utilities to provide mitigation of sulfur and mercury release into the environment while avoiding high capital costs of equipment for compliance and/or realizing return from the sale of waste materials would be a significant advance.

SUMMARY

Methods of operating coal burning facilities involve the application of technology to reduce emissions of sulfur, mercury, and/or other harmful emissions. The reduction in emissions results in environmental benefits and can lead to tax credits and other financial benefits. The methods are non-capital in that they do not require large investments in scrubbers or other equipment. The methods involve the addition of various sorbent components or sorbent compositions before or during the burning of coal to entrap contaminants in the coal ash rather than release the contaminants to the atmosphere. Even though the contaminant reports to the ash produced upon combustion of coal, the ash is still a commercially viable product, because it has enhanced industrial and environmental properties. Thus, in some embodiments, the present teachings provides both for environmental control and the gain of value from the sale of a waste material.

In some embodiments, the methods involve adding sorbent components, such as calcium oxide, alumina, and silica, as well as optional halogens as part of environmental control. Use of the sorbents leads to significant reductions in sulfur and mercury emissions that otherwise would result from burning coal. Use of the sorbents leads to production of waste coal ash that, while higher in mercury, is nevertheless usable as a commercial product because the mercury in the ash is non-leaching and because the coal ash has a higher cementitious nature by virtue of the increased content of the sorbent components in the ash. Thus, in some embodiments, the methods involve adding powders having qualities that lead to the production of a cementitious coal ash while at the same time reducing emissions from a coal burning facility.

Use of the methods provides a wide range of benefits to the coal burning utility:

1) emissions of mercury (both oxidized and elemental mercury) and/or sulfur are significantly decreased, allowing compliance with sulfur and mercury emission regulations and protecting the local environment. In some embodiments, nitrogen oxides are also reduced;
2) no scrubbers are needed to comply with environmental and health concerns, resulting in the avoidance of high capital investment costs;
3) the ash resulting from the burning of coal has an increased cementitious nature and can be used in various industrial applications;
4) the value of the coal is increased as much as 50% or greater;
5) the disposal costs of the fly ash are avoided because the ash has commercial value;
6) costs of non-compliance with environmental regulations such as fines and costs of emission credits are avoided;
7) the costs avoided and revenue realized contribute favorably to the balance sheet of the utility operator; and
8) the costs avoided and the revenue realized increase the return on investment from adoption of the control systems described herein;

Further areas of applicability will become apparent from the description provided herein. It should be understood that the description and specific examples are intended for purposes of illustration only and are not intended to limit the scope of the present teachings.

DRAWINGS

The skilled artisan will understand that the drawings, described herein, are for illustration purposes only. The drawings are not intended to limit the scope of the present teachings in any way.

FIG. 1 is block diagram illustrating a non-limiting example of elements of total capital investment for installing and maintaining a pollution control device;

DETAILED DESCRIPTION

Figure 2:
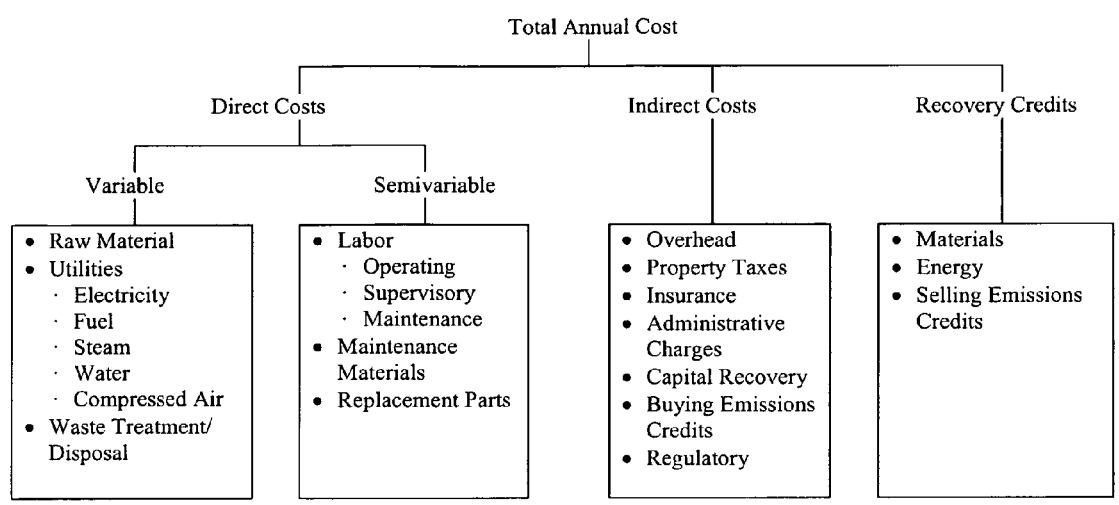
FIG. 2 is a diagram illustrating a non-limiting example of various annual costs and their interrelationships in decision making for pollution control options.

The following description is merely exemplary in nature and is not intended to limit the present teachings, application, or uses. Although the present teachings will be discussed in some embodiments as relating to coal burning facilities, such as power plants producing electricity and cement factories, such discussion should not be regarded as limiting the present teachings to only such applications.

In some embodiments, methods of doing business are provided that involves operating a coal plant to produce heat energy and waste ash. During operation of the coal plant, the coal is burned in the presence of a sorbent or sorbent components that increase the amount of mercury, lead, and/or other heavy metals in the fly ash. However, use of the same sorbent also results in fly ash containing a very low level of leachable mercury. As a result, the non-leaching fly ash is then sold as an industrial raw material. Costs are avoided and value is added to the business operation by both the reduction of mercury emissions resulting from the combustion of the coal and the return realized on the sale of the waste fly ash.

In some embodiments, the present teachings provide a method of increasing the value of coal burned in a coal burning plant comprising combusting mercury coal in the presence of at least one sorbent to produce heat energy, fly ash, and flue gases. By the use of the sorbents, an operator avoids capital costs of adding chemical scrubbers to the plant and avoids disposal costs of the fly ash that results from burning the coal. An amortized capital savings per unit of coal burned is calculated and the result is used to offset the cost of sorbent and/or coal. Likewise, the savings in disposal costs are used to offset the cost of operating the plant. In some embodiments, the savings realized from the use of sorbent are greater than the cost of using the sorbent. Use of the sorbent in the method leads to reduced capital outlays for scrubbers and other equipment, optionally increases revenue through the sale of the waste ash, increasing the bottom line profits of the organization running a coal burning facility and improving the overall balance sheet of the operator. In some embodiments, the savings from use of the sorbent increase the value of the coal burned by at least 50%.

In some embodiments, the present teachings provide a method of operating the coal burning facility comprising burning the coal in the presence of sorbent components or sorbent composition and selling the energy generated by burning the coal. The sorbent components are added onto the coal prior to combustion, and/or applied into the furnace during combustion and/or applied into the flue gases downstream of the furnace. Use of the sorbent leads to reduced emissions of mercury and sulfur compared to burning the coal without the sorbent. It also renders the coal ash (such as the fly ash) more cementitious in nature compared to fly ash produced from burning coal without the sorbent. In some embodiments, burning with the sorbent increases the power generation from burning the coal. For example, a coal composition containing 95% coal and 5% sorbent generates as much electricity output as a composition containing 100% coal. The gain in electrical output is a further financial benefit of the method.

Use of the sorbent, although it normally leads to increased levels of mercury, lead, and/or other heavy metals in the fly ash, actually reduces the amount of mercury, lead, and other heavy metals that leach from the fly ash in standard environmental leaching tests. As a result, harmful releases to the environment are reduced and the commercial value of the waste fly ash is enhanced.

In some embodiments, the present teachings provide methods of comparing return on investment for various ways of complying with environmental regulations regarding release of mercury, and making business decisions based on the return on investment analysis.

A first system is provided that calls for the use of sorbents added onto coal or into the coal burning facility during combustion. Use of the sorbents reduces mercury and/or sulfur emissions and produces ash with increased levels of mercury, but with low (and environmentally acceptable) levels of leachable mercury. A second system is provided that involves a capital investment in chemical scrubbers or the like, but without the use of the sorbent components. A return on investment is calculated for both the first system and the second system. Then, the return on investment for the two systems is compared and a business decision is made between adopting the first system and adopting the second system based on the calculated return on investment. In some embodiments, return on investment is calculated by any financially acceptable model, including the net present value model and/or internal rate of return.

In some embodiments, a balance sheet for the facility operator is calculated based on adoption of the first system or adoption of the second system. The balance sheet is prepared for the current year and future years based on assumptions about revenues, capital expenditures, expenses, and value of assets resulting from adopting of either of the systems. Optionally, an income statement is also produced for the operator. As with the return on investment, the balance sheet and/or income statement is compared based on adopting the first system, or the second system, and a business decision is made based on that comparison.

In some embodiments, the present teachings provide methods of increasing the economic value of fly ash resulting from combustion of coal containing mercury. The fly ash is produced by burning the coal in the presence of sorbent components. The fly ash resulting from the combustion is more cementitious in nature than fly ash produced from burning coal without the sorbents. The ash also sequesters mercury, lead, and other heavy metal to a higher extent than ash produced from combustion without the sorbent. In some embodiments, the sorbent includes alkaline powders containing calcium oxide or equivalent, silica, and alumina. Methods of treating the coal in the coal burning facility or during combustion of the coal in the facility with the sorbent reduced environmental emissions, make the resulting ash more commercially valuable. The methods of treating the coal avoid significant capital expenditure for the installation of chemical scrubbers or other such devices.

In some embodiments, the present teachings provides methods of operating a coal burning facility without a scrubber yet complying with regulations as to sulfur and mercury emissions. In some embodiments, sulfur is significantly reduced, while mercury emissions are reduced by 90% or more. Thus, in some embodiments, the methods involve burning the coal in the presence of a powder sorbent, thereby removing at least 90% of the mercury in the coal from the flue gases, and selling the resulting fly ash. In some embodiments, burning the coal not only complies with mercury and sulfur emission standards, but the waste ash including the fly ash is sold as a valuable commodity. The return from sale of the waste ash at least partially offsets the costs of using the sorbents.

In some embodiments, methods involve operating the coal plant as above to produce energy and waste ash. A sorbent is added that reduces the mercury emissions and reduces the mercury leaching from the fly ash. The fly ash is then recovered and mixed with a cementitious powder to make a cement product. The cement is available to be sold in the commercial market. The fly ash recovered from the coal burning facility is highly suitable to be used in the cement product because it itself is more cementitious than fly ash produced by burning coal without the sorbent, and because the increased levels of mercury in the fly ash are non-leaching according to standard environmental leaching tests.

In some embodiments, the present teachings provide methods of increasing a value of coal burned in a coal burning facility, which include combusting coal containing mercury in a presence of at least one sorbent to produce heat energy, ash, and flue gases, the ash containing at least 90% by weight of the mercury originally present in the coal, the ash having an amount of acid leachable mercury that is less than a level of acid leachable mercury in an ash produced by combusting coal without the at least one sorbent. In some embodiments, methods include monitoring the flue gases for the mercury and adjusting the presence of the at least one sorbent to achieve a desired mercury emission to comply with an environmental regulation and realizing a monetary savings by an avoidance of disposal costs of the fly ash produced. In some embodiments, the methods include calculating a net savings per unit of coal burned and/or reflecting the monetary savings on one or more financial statements.

In some embodiments, the present teachings provide methods of operating a coal burning facility which include combusting coal in a presence of a sorbent composition and generating energy by the combusting coal. In some embodiments, the sorbent composition is at least one of added onto the coal prior to the combusting, applied into a furnace during the combusting and applied into flue gases downstream of the furnace. In some embodiments, the presence of the sorbent composition reduces emissions of at least one of mercury and sulfur compared to combusting coal without the sorbent composition. In some embodiments, the presence of the sorbent composition produces a coal ash more cementitious in nature compared to a coal ash produced from combusting coal without the presence of the sorbent composition. In some embodiments, the combusting coal in the presence of the sorbent composition increases a power generation per unit of coal burned as compared to combusting coal without the presence of the sorbent composition.

The sorbents used in the methods of the present teachings include alkaline powders and/or liquid compositions containing calcium, silica, alumina, and optionally a halogen such as bromine. Suitable sorbent components and compositions, as well as methods for their use are described in U.S. Provisional Application filed Jan. 18, 2006 entitled "Sorbents for Mercury and Sulfur Remediation" by Douglas Comrie; in U.S. Provisional Ser. No. 60/662,911 filed Mar. 17, 2005 by Douglas Comrie; and in U.S. Provisional Application 60/742,154 filed Dec. 2, 2005 by Douglas Comrie; the full disclosures of which are hereby incorporated by reference.

In some embodiments, an ash product is produced by burning coal in the presence of sorbent components comprising calcium, silica, alumina, and a halogen such as bromine. The components are added as parts of one or more sorbent compositions into the coal-burning system. In a non-limiting example, sorbent components calcium, silica, and alumina are added together in an alkaline powder sorbent composition that comprises about 2 to 15% by weight $Al_2O_3$, about 30 to 75% by weight CaO, about 5 to 20% by weight $SiO_2$, about 1 to 10% $Fe_2O_3$, and about 0.1 to 5% by weight total alkali, such as sodium oxide and potassium oxide. In some embodiments, the sorbents comprise about 2 to 10% by weight $Al_2O_3$, about 40 to 70% by weight CaO, about 5 to 15% by weight total alkalis. In some embodiments, powder sorbent compositions described herein contain one or more alkaline powders containing calcium, along with lesser levels of one or more aluminosilicate materials. A halogen component, if desired, is added as a further component of the alkaline powder or is added separately as part of a liquid or powder composition.

To make the ash products, a carbonaceous fuel is burned to produce heat energy from combustion of the carbonaceous material. In some embodiments, the carbonous fuel can be coal. Unburned material and particulate combustion products form an ash that collects at the bottom of the furnace or is collected from the flue by precipitators or filters, for example a bag house on a coal burning facility. The content of the bottom ash and the fly ash depends on the chemical composition of the coal and on the amount and composition of sorbent components added into the coal burning facility during combustion.

Major elements in coal, besides carbon, include silica, alumina, and calcium, along with lesser amounts of iron. In addition, trace heavy metals such as arsenic, antimony, lead, chromium, cadmium, nickel, vanadium, molybdenum, manganese, copper, and barium are normally present. These elements tend to report to the ash upon combustion of coal. Coal also contains significant amounts of sulfur. Upon combustion, the sulfur in coal burns to produce volatile sulfur oxides, which tend to escape from the coal burning utility in gaseous form. A major cause of acid raid is sulfur dioxide emissions. As generally known in the art, when sulfur dioxide is mixed with water, sulfuric acid is formed. It is desired to remediate or reduce the level of sulfur oxides emitted from coal burning plants.

Coal also contains mercury. Although present at a low level, mercury tends to volatilize during combustion and escape from the coal burning utility. Even at the low levels produced from the combustion of coal, the release of mercury into the environment is undesirable because the element is toxic and tends to accumulate in body tissues. Because of mercury's damaging effect on health and the environment, its release has recently come under regulatory control in the United States and elsewhere in the world. Whether mercury is subject to regulatory controls or not, it is highly desirable to reduce the amount of mercury emitted from coal burning utilities.

In some embodiments, the sorbent compositions that tend to reduce or remediate the release of mercury and/or sulfur from coal burning utilities also have the beneficial effect of rendering the ash produced by combustion of the fuel highly cementitious so that it is usable in commerce as a partial or complete replacement for Portland cement in various cement and concrete products. The ash produced from the coal combustion with the current sorbent is useful in commerce, not only for its highly cementitious nature, but also for the fact that it contains heavy metals resulting from the combustion of coal in a non-leaching form in the ash. That is, mercury, arsenic, lead and other heavy metals in the coal report to the ash. Burning the coal with the sorbent compositions described herein results in an ash that has, in some embodiments, increased levels of the heavy metals compared to coal burned without the sorbent, but which nevertheless contains lower levels of leachable heavy metals than the ash produced without the sorbents. As a result, the ash is safe to handle and to sell into commerce, for example as a cementitious material.

In some embodiments, a process involves application of sorbents directly into the furnace during combustion (addition "co-combustion") directly to a fuel such as coal before combustion (addition "pre-combustion"); directly into the gaseous stream after combustion preferably in a temperature zone of greater than 500° C. and preferably greater than 800° C. (addition "post-combustion"); or in any combination of pre-combustion, co-combustion, and post-combustion additions.

In some embodiments, coal is burned along with other fuels in co-generation plants. Such plants are flexible in the fuels they burn. In addition to bituminous and sub-bituminous coal, such facilities can also burn other fuels such as municipal waste, sewage sludge, pet coke, biomass (such as without limitation wood, wood chips, agricultural waste, and/or sawdust), scrap plastics, shredded tires, and the like. To the extent that the fuels contain mercury and sulfur, use of sorbents as described herein tends to mitigate or lower emissions of sulfur and/or mercury that would otherwise be released into the atmosphere upon combustion, It also produces an ash product with a highly cementitious nature.

Depending on the fuel value of the fuel being burned, the flame temperature in such co-generation plants varies upward from about 1000° F.-1200° F. (for low value fuels or fuels containing high proportions of low value biomass or other low-value components) to 2700° F. to 3600° F. or higher (for high BTU coal or fuel mixes with a high proportion of high BTU coal). In some embodiments, use of sorbents of the present teachings mitigates mercury emissions from systems burning at relatively lower temperatures. It is believed the alkaline powder sorbents described herein are effective at removing oxidized mercury from the flue gases, and that oxidized mercury is the species predominantly formed by combustion at the lower temperatures.

Thus, in some embodiments, co-generation plants burning a combination of coal, biomass (e.g., woodchips, sawdust, plant wastes, crop wastes, animal wastes, sludge, and the like) and/or recyclable polymeric material (e.g. scrap rubber tires) are treated with sorbent compositions to achieve significant reductions in emissions of mercury and/or sulfur, and to produce an ash product with good cementitious qualities.

In some embodiments, mercury emissions from the coal burning facility are monitored. Emissions are monitored as elemental mercury, oxidized mercury, or both. Elemental mercury means mercury in the ground or zero oxidation state, while oxidized mercury means mercury in the +1 or +2 oxidation state. Depending on the level of mercury in the flue gas prior to emission from the plant, the amount of sorbent composition added pre-, co-, and/or post-combustion is raised, lowered, or is maintained unchanged. In general, it is desirable to remove as high a level of mercury as is possible. In some embodiments, mercury removal of 90% and greater is achieved, based on the total amount of mercury in the coal. This number refers to the mercury removed from the flue gases so that mercury is not released through the stack into the atmosphere. Normally, removal of mercury from the flue gases leads to increased levels of mercury in the ash. To minimize the amount of sorbent added into the coal burning process so as to reduce the overall amount of ash produced in the furnace, it is desirable in many embodiments to use the measurements of mercury emissions to adjust the sorbent composition rate of addition to one which will achieve the desired mercury reduction without adding excess material into the system.

In some embodiments of burning coal or other fuels with the added sorbent components, mercury and other heavy metals in the coal such as arsenic, antimony, lead, and others report to the bag house or electrostatic precipitator and become part of the overall ash content of the coal burning plant; alternatively or in addition, the mercury and heavy metals are found in the bottom ash. As such, mercury and other heavy metals are not emitted from the facility. In general, mercury and other heavy metals in the ash are resistant to leaching under acidic conditions, even though they tend to be present in the ash at elevated levels relative to ash produced by burning coal without the sorbent components described herein. Advantageously, heavy metals in the ash do not leach beyond regulatory levels; in fact, a decreased level of leachable heavy metal is observed in the ash on a ppb basis, even though the ash normally contains a higher absolute level of heavy metals by virtue of being produced by burning with the sorbents. Because in addition the cementitious nature of the ash is enhanced, the ash from the combustion (coal ash) is valuable for sale in commerce and use, for example, as a cementitious material to make Portland cements as well as concrete products and ready mixes.

In some embodiments, leaching of heavy metals is monitored or analyzed periodically or continuously during combustion. The TCLP procedure of the United States Environmental Protection Agency is a commonly used method. As with mercury in the flue gas, the amount of sorbent, particularly of sorbent components with Si ($SiO_2$ or equivalents) and/or Al ($Al_2O_3$ or equivalents), is adjusted based on the analytical result to maintain the leaching in a desired range.

In some embodiments, the present teachings provides a method for reducing the amount of oxidized mercury in flue gases that are generated by combustion of mercury-containing carbonaceous fuel such as coal while at the same time producing and cementitious ash product. The method comprises burning the fuel in the presence of an alkaline powder sorbent wherein the powder sorbent comprises calcium, silica, and alumina. While the fuel is burning, a level of mercury (oxidized, elemental, or both) is measured in the flue gases downstream from the furnace. The measured mercury level is compared to a target level and, if the measured level is above the targeted level, the amount of powder sorbent added relative to the amount of fuel being burned is increased. Alternatively, if the measured level is at or below the target level, the rate of sorbent addition can be decreased or maintained unchanged.

In some embodiments, a method for reducing sulfur and/or mercury in the flue gases produced by the combustion of coal in the furnace of a coal burning facility involves injecting a powder composition into the furnace during combustion. The powder composition is an alkaline sorbent composition that contains an alkaline calcium component as well as significant levels of silica and alumina. In a non-limiting embodiment, the powder composition comprises 2 to 50% of an aluminosilicate material and 50 to 98% by weight of an alkaline powder comprising calcium. In some embodiments, the alkaline powder comprises one or more of Portland cement, cement kiln dust, lime kiln dust, and sugar beet lime, while the aluminosilicate material contains one or more selected from the group consisting of calcium, montmorillonite, sodium montmorillonite, and kaolin. The powder composition is added to the coal at a rate of about 0.1 to about 10% by weight, based on the amount of coal being treated with the sorbents for a batch process, or on the rate of coal being consumed by combustion for a continuous process. In some embodiments, the rate is from 1 to 8% by weight, 2 to 8% by weight, 4 to 8% by weight, or about 6% by weight. In some embodiments, the powder composition is injected to the fireball or furnace during combustion and/or is applied to the coal under ambient conditions, prior to its combustion. The temperature at the injection point is preferably at least about 1000° F. or higher. For some low value fuels, this corresponds to injection into or close to the fireball.

In some embodiments, the present teachings provide novel sorbent compositions comprising about 50 to 98% by weight of at least one of Portland cement, cement kiln dust, lime kiln dust, sugar beet lime, and 2 to 50% by weight of an aluminosilicate material. In some embodiments, the compositions further comprise a bromine compound, for example, as a bromide, such as calcium bromide. Use of the sorbents during the coal burning process as described herein tends to lessen the amount of harmful sulfur and mercury products emitted from the facility, while at the same time producing an ash that is environmentally acceptable (e.g. leaching of heavy metals is below regulatory levels and is lower than in ash produced by burning the coal without the sorbent components) and highly cementitious in nature so that the ash serves as a complete or partial (greater than 40%, preferably greater than 50%) replacement for Portland cement in cementitious mixtures and processes for their use.

In some embodiments, sorbent components are added as part of a single composition, and/or as separate components onto the fuel pre-combustion, into the furnace co-combustion, and/or into the convective pathway post-combustion. For example, it is convenient to add the alkaline components containing calcium together with the silica and alumina as a single composition. When used, a halogen compound such as a bromine compound is provided as part of the single composition or as a separate composition.

In some embodiments, a dual system is used wherein calcium, silica, and alumina are added in a powder sorbent, while bromine or other halogen(s) is added in a liquid sorbent. The method of the present teachings provides coal ash and/or fly ash containing mercury at a level corresponding to capture in the ash of at least 90% of the mercury originally in the coal before combustion. In some embodiments, the mercury level is higher than in known fly ashes due to capture of mercury in the ash rather than release of mercury into the atmosphere. Fly ash produced by the process contains up to 200 ppb mercury or higher; in some embodiments the mercury content of the fly ash is above 250 ppb. Since the volume of ash is normally increased by use of the sorbents (in some embodiments, the volume of ash about doubles), the increased measured levels of mercury represent significant capture in the ash of mercury that without the sorbents would have been released into the environment. The content in the fly ash of mercury and other heavy metals such as lead, chromium, arsenic, and cadmium is generally higher than in fly ash produced from burning coal without the added sorbents or sorbent components.

A process for making the coal ash involves burning coal in the presence of added calcium, silica, and alumina, and preferably in the further presence of a halogen such as bromine. In some embodiments, ash is prepared by burning coal in the presence of sorbents or sorbent components described herein. In some embodiments, the mercury in the coal ash is non-leaching in that it exhibits a concentration of mercury in the extract of less than 0.2 ppb when tested using the Toxicity Characteristic Leaching Procedure (TCLP), test Method 1311 in "Test Methods for Evaluating Solid Waste, Physical/Chemical Methods," EPA Publication SW—846—Third Edition, as incorporated by reference in 40 CFR §260.11. It is normally observed that fly ash from burning coal with the sorbents described herein has less leachable mercury than ash produced from burning coal without the sorbent, even though the total mercury content in ash produced from the sorbent treated coal is higher by as much as a factor of 2 or more over the level in ash produced by burning without the sorbents. To illustrate, typical ash from burning of PRB coal contains about 100-125 ppb mercury; in various embodiments, ash produced by burning PRB coal with about 6% by weight of the sorbents described herein has about 200-250 ppb mercury or more.

In some embodiments, the present teachings provide a hydraulic cement product containing Portland cement and from 0.1% to about 99% by weight, based on the total weight of the cement product, of a coal ash or fly ash described above.

In some embodiments, the present teachings provide a pozzolanic product comprising a pozzolan and from 0.01% to about 99% by weight, based on the total weight of the pozzolanic product of the ash described above.

The present teachings also provide a cementitious mixture containing the hydraulic cement described above.

In some embodiments, a cementitious mixture contains coal ash described herein as the sole cementitious component; in some embodiments, the ash is a total replacement for conventional cements such as Portland cement. The cementitious mixtures contain cement and optionally aggregate, fillers, and/or other admixtures. The cementitious mixtures are normally combined with water and used as concrete, mortars, grout, flowable fill, stabilized base, and other applications.

Sorbent compositions of the present teachings contain components that contribute calcium, silica, and alumina, preferably in the form of alkaline powders. In some embodiments, the compositions also contain iron oxide, as well as basic powders based on sodium oxide ($Na_2O$) and potassium oxide ($K_2O$). In a non-limiting example, the powder sorbent contains about 2-10% by weight $Al_2O_3$, about 40-70% CaO, about 5-15% $SiO_2$, about 2-9% $Fe_2O_3$, and about 0.1-5% total alkalis such as sodium oxide and potassium oxide. The components comprising calcium, silica, and alumina and other elements if present, are combined together in a single composition or are added separately or in any combination as components to the fuel burning system. In some embodiments, use of the sorbents leads to reductions in the amount of sulfur and/or mercury released into the atmosphere. In various embodiments, use of the sorbent compositions leads to the removal of mercury, especially oxidized mercury. In addition, the compositions reduce the amount of sulfur given off from combustion by a virtue of their calcium content.

Advantageously, the sorbent compositions contain suitable high levels of alumina and silica. It is believed that the presence of alumina and/or silica leads to several advantages seen from use of the sorbent. To illustrate, it is believed that the presence of alumina and/or silica and/or the balance of the silica/alumina with calcium, iron, and other ingredients contributes to the low acid leaching of mercury and/or other heavy metals that is observed in ash produced by combustion of coal or other fuels containing mercury in the presence of the sorbents.

In some embodiments, it is observed that use of the sorbent compositions during combustion of coal or other fuel leads to the formation of a refractory lining on the walls of the furnace and on the boiler tubes. It is believed that such a refractory lining reflects heat in the furnace and leads to higher water temperature in the boilers. In some embodiments, it is also observed that use of the sorbent results in reduced scale formation or slagging around the boiler tubes. In this way, use of the sorbents leads to cleaner furnaces, but more importantly improves the heat exchange between the burning coal and the water in the boiler tubes. As a result, in some embodiment's use of the sorbents leads to higher water temperature in the boiler, based on burning the same amount of fuel.

Alternatively, it has been observed that use of the sorbent allows the feed rate of, for example, coal to be reduced while maintaining the same power output or boiler water temperature. In an illustrative embodiment, use of a sorbent at a 6% rate results in combustion of a coal/sorbent composition that produces as much power as a composition of the same weight that is all coal. It is seen in some embodiments that use of the sorbent, which is normally captured in the fly ash and recycled, actually increases the efficiency of the coal burning process, leading to less consumption of fuel. Advantageously in such a process, the fly ash, which is normally increased in volume by virtue of the use of the sorbent, is recycled for use in Portland cement manufacture and the like, it having an improved cementitious nature and low heavy metal leaching.

As noted, in some embodiments, the components of the sorbent composition are provided as alkaline powders. Without being limited by theory, it is believed that the alkaline nature of the sorbent components leads at least in part to the desirable properties described above. Sources of calcium for the sorbent compositions of the present teachings include calcium powders such as calcium carbonate, limestone, calcium oxide, calcium hydroxide, calcium phosphate, and other calcium salts. It is understood that industrial products such as limestone, lime, slaked lime, and the like contribute major proportions of such calcium salts. As such, they are suitable components for the sorbent compositions of the present teachings.

Other sources of calcium include various manufactured products. Such products are commercially available, and some are sold as waste products or by-products of other industrial processes. In some embodiments, the products further contribute either silica, alumina, or both to the compositions of the present teachings. Non-limiting examples of industrial products that contain silica and/or alumina in addition to calcium include Portland cement, cement kiln dust, lime kiln dust, sugar beet lime, slags (such as steel slag, stainless steel slag, and blast furnace slag), paper de-inking sludge ash, cupola arrester filter cake, and cupola furnace dust. These and other materials are combined to provide alkaline powders or mixtures of alkaline powders that contain calcium, and preferably also contain silica and alumina. In some embodiments, various pozzolanic materials are used.

Sugar beet lime is a solid waste material resulting from the manufacture of sugar from sugar beets. It is high in calcium content, and also contains various impurities that precipitate in the liming procedure carried out on sugar beets. It is an item of commerce, and is normally sold to landscapers, farmers, and the like as a soil amendment.

Cement kiln dust (CKD) generally refers to a byproduct generated within a cement kiln or related processing equipment during Portland cement manufacturing.

Generally, CKD comprises a combination of different particles generated in different areas of the kiln, pre-treatment equipment, and/or material handling systems, including, for example, clinker dust, partially to fully calcined material dust, and raw material (hydrated and dehydrated) dust. The composition of the CKD varies based upon the raw materials and fuels used, the manufacturing and processing conditions, and the location of collection points for CKD within the cement manufacturing process. CKD can include dust or particulate matter collected from kiln effluent (i.e., exhaust) streams, clinker cooler effluent, pre-calciner effluent, air pollution control devices, and the like.

While CKD compositions will vary for different kilns, CKD usually has at least some cementitious and/or pozzolanic properties, due to the presence of the dust of clinker and calcined materials. Typical CKD compositions comprise silicon-containing compounds, such as silicates including tricalcium silicate, dicalcium silicate; aluminum-containing compounds, such as aluminates including tricalcium aluminate; and iron-containing compounds, such as ferrites including tetracalcium aluminoferrite. CKD generally comprises calcium oxide (CaO). Exemplary CKD compositions comprise about 10 to about 60% calcium oxide, optionally about 25 to about 50%, and optionally about 30 to about 45% by weight. In some embodiments, CKD comprises a concentration of free lime (available for a hydration reaction with water) of about 1 to about 10%, optionally of about 1 to about 5%, and in some embodiments about 3 to about 5%. Further, in some embodiments, CKD comprises compounds containing alkali metals, alkaline earth metals, and sulfur, inter alia.

Other exemplary sources for the alkaline powders comprising calcium, and some further comprising silica and alumina, include various cement-related byproducts (in addition to Portland cement and CKD described above). Blended-cement products are one suitable example of such a source. These blended cement products typically contain mixes of Portland cement and/or its clinker combined with slag(s) and/or pozzolan(s) (e.g., fly ash, silica fume, burned shale). Pozzolans are usually siliceous materials that are not in themselves cementitious, but which develop hydraulic cement properties when reacted with free lime (free CaO) and water. Other sources are masonry cement and/or hydraulic lime, which include mixtures of Portland cement and/or its clinker with lime or limestone. Other suitable sources are aluminous cements, which are hydraulic cements manufactured by burning a mix of limestone and bauxite (a naturally occurring, heterogeneous material comprising one or more aluminum hydroxide minerals, plus various mixtures of silica, iron oxide, titania, aluminum silicates, and other impurities in minor or trace amounts). Yet another example is a pozzolan cement, which is a blended cement containing a substantial concentration of pozzolans. Usually the pozzolan cement comprises calcium oxide, but is substantially free of Portland cement. Common examples of widely-employed pozzolans include natural pozzolans (such as certain volcanic ashes or tuffs, certain diatomaceous earth, burned clays and shales) and synthetic pozzolans (such as silica fume and fly ash).

Lime kiln dust (LKD) is a byproduct from the manufacturing of lime. LKD is dust or particulate matter collected from a lime kiln or associated processing equipment. Manufactured lime can be categorized as high-calcium lime or dolomitic lime, and LKD varies based upon the processes that form it. Lime is often produced by a calcination reaction conducted by heating calcitic raw material, such as calcium carbonate ($CaCO_3$), to form free lime CaO and carbon dioxide ($CO_2$). High-calcium lime has a high concentration of calcium oxide and typically some impurities, including aluminum-containing and iron-containing compounds. High-calcium lime is typically formed from high purity calcium carbonate (about 95% purity or greater). Typical calcium oxide content in an LKD product derived from high-calcium lime processing is greater than or equal to about 75% by weight, optionally greater than or equal to about 85% by weight, and in some cases greater than or equal to about 90% by weight. In some lime manufacturing, dolomite ($CaCO_3.MgCO_3$) is decomposed by heating to primarily generate calcium oxide (CaO) and magnesium oxide (MgO), thus forming what is known as dolomitic lime. In LKD generated by dolomitic lime processing, calcium oxide can be present at greater than or equal to about 45% by weight, optionally greater than about 50% by weight, and in some embodiments, greater than about 55% by weight. While LKD varies based upon the type of lime processing employed, it generally has a relatively high concentration of free lime. Typical amounts of free lime in LKD are about 10 to about 50%, optionally about 20 to about 40%, depending upon the relative concentration of calcium oxide present in the lime product generated.

Slags are generally byproduct compounds generated by metal manufacturing and processing. The term "slag" encompasses a wide variety of byproduct compounds, typically comprising a large portion of the non-metallic byproducts of ferrous metal and/or steel manufacturing and processing. Generally, slags are considered to be a mixture of various metal oxides, however they often contain metal sulfides and metal atoms in an elemental form.

Various examples of slag byproducts useful for some embodiments of the present teachings include ferrous slags, such as those generated in blast furnaces (also known as cupola furnaces), including, by way of example, air-cooled blast furnace slag (ACBFS), expanded or foamed blast furnace slag, pelletized blast furnace slag, granulated blast furnace slag (GBFS), and the like. Steel slags can be produced from basic oxygen steelmaking furnaces (BOS/BOF) or electric arc furnaces (EAF). Many slags are recognized for having cementitious and/or pozzolanic properties, however the extent to which slags have these properties depends upon their respective composition and the process from which they are derived, as recognized by the skilled artisan. Exemplary slags comprise calcium-containing compounds, silicon-containing compounds, aluminum-containing compounds, magnesium-containing compounds, iron-containing compounds, manganese-containing compounds and/or sulfur-containing compounds. In some embodiments, the slag comprises calcium oxide at about 25 to about 60%, optionally about 30 to about 50%, and optionally about 30 to about 45% by weight. One example of a suitable slag generally having cementitious properties is ground granulated blast furnace slag (GGBFS).

As described above, other suitable examples include blast (cupola) furnace dust collected from air pollution control devices attached to blast furnaces, such as cupola arrester filter cake. Another suitable industrial byproduct source is paper de-inking sludge ash. As recognized by those of skill in the art, there are many different manufactured/industrial process byproducts that are feasible as a source of calcium for the alkaline powders that form the sorbent compositions of the present teachings. Many of these well known byproducts comprise alumina and/or silica, as well. Combinations of any of the exemplary manufactured products and/or industrial byproducts are also contemplated for use as the alkaline powders of certain embodiments of the present teachings.

In some embodiments, desired treat levels of silica and/or alumina are above those provided by adding materials such as Portland cement, cement kiln dust, lime kiln dust, and/or sugar beet lime. Accordingly, it is possible to supplement such materials with aluminosilicate materials, such as without limitation clays (e.g. montmorillonite, kaolins, and the like) where needed to provide preferred silica and alumina levels. In some embodiments, supplemental aluminosilicate materials make up at least about 2%, and preferably at least about 5% by weight of the various sorbent components added into the coal burning system. In general, there is no upper limit from a technical point of view as long as adequate levels of calcium are maintained. However, from a cost standpoint, it is normally desirable to limit the proportion of more expensive aluminosilicate materials. Thus, the sorbent components preferably comprise from about 2 to 50%, preferably 2 to 2%, and more preferably, about 2 to 10% by weight aluminosilicate material such as the exemplary clays.

In some embodiments, an alkaline powder sorbent composition contains one or more calcium-containing powders such as Portland cement, cement kiln dust, lime kiln dust, various slags, and sugar beet lime, along with an aluminosilicate clay such as, without limitation, montmorillonite or kaolin. In some embodiments, the sorbent composition can contain sufficient $SiO_2$ and $Al_2O_3$ to form a refractory-like mixture with calcium sulfate produced by combustion and with mercury and other heavy metals such that the calcium sulfate is handled by the particle control system of the furnace and mercury and heavy metals are not leached from the ash under acidic conditions. In some embodiments, the calcium containing powder sorbent contains by weight a minimum of 2% silica and 2% alumina, preferably a minimum of 5% silica, and 5% alumina. In some embodiments, the alumina level is higher than that found in Portland cement, that is to say higher than about 5% by weight and, in some embodiments, higher than about 6% by weight, based on $Al_2O_3$.

In some embodiments, the sorbent components of the alkaline powder sorbent composition work together with optional added halogen (such as bromine) compound or compounds to capture chloride as well as mercury, lead, arsenic, and other heavy metals in the ash, render the heavy metals non-leaching under acidic conditions, and improve the cementitious nature of the ash produced. As a result, emissions of mercury, other heavy metals such as arsenic, sulfur, and chlorine are mitigated, reduced, or eliminated, and a valuable cementitious material is produced as a by-product of coal burning.

Suitable aluminosilicate materials include a wide variety of inorganic minerals and materials. For example, a number of minerals, natural materials, and synthetic materials contain silicon and aluminum associated with an oxy environment along with optional other cations such as, without limitation, Na, K, Be, Mg, Ca, Zr, V, Zn, Fe, Mn, and/or other anions, such as hydroxide, sulfate, chloride, carbonate, along with optional waters of hydration. Such natural and synthetic materials are referred to herein as aluminosilicate materials and are exemplified in a non-limiting way by the clays noted above.

In aluminosilicate materials, the silicon tends to be present as tetrahedra, while the aluminum is present as tetrahedra, octahedra, or a combination of both. Chains or networks of aluminosilicate are built up in such materials by the sharing of 1, 2, or 3 oxygen atoms between silicon and aluminum tetrahedra or octahedra. Such minerals go by a variety of names, such as silica, alumina, aluminosilicates, geopolymer, silicates, and aluminates. However presented, compounds containing aluminum and/or silicon tend to produce silica and alumina upon exposure to high temperatures of combustion in the presence of oxygen In some embodiments, aluminosilicate materials include polymorphs of $SiO_2.Al_2O_3$. For example, silliminate contains silica octahedra and alumina evenly divided between tetrahedra and octahedra. Kyanite is based on silica tetrahedra and alumina octahedra. Andalusite is another polymorph of $SiO_2.Al_2O_3$.

In some embodiments, chain silicates contribute silicon (as silica) and/or aluminum (as alumina) to the compositions of the present teachings. Chain silicates include without limitation pyroxene and pyroxenoid silicates made of infinite chains of $SiO_4$ tetrahedra linked by sharing oxygen atoms.

Other suitable aluminosilicate materials include sheet materials such as, without limitation, micas, clays, chrysotiles (such as asbestos), talc, soapstone, pyrophillite, and kaolinite. Such materials are characterized by having layer structures wherein silica and alumina octahedra and tetrahedra share two oxygen atoms. Layered aluminosilicates include clays such as chlorites, glauconite, illite, polygorskite, pyrophillite, sauconite, vermiculite, kaolinite, calcium montmorillonite, sodium montmorillonite, and bentonite. Other examples include micas and talc.

Suitable aluminosilicate materials also include synthetic and natural zeolites, such as without limitation the analcime, sodalite, chabazite, natrolite, phillipsite, and mordenite groups. Other zeolite minerals include heulandite, brewsterite, epistilbite, stilbite, yagawaralite, laumontite, ferrierite, paulingite, and clinoptilolite. The zeolites are minerals or synthetic materials characterized by an aluminosilicate tetrahedral framework, ion exchangeable "large cations" (such as Na, K, Ca, Ba, and Sr) and loosely held water molecules.

In some embodiments, framework or 3D silicates, aluminates, and aluminosilicates are used. Framework aluminosilicates are characterized by a structure where $SiO_4$ tetrahedra, $AlO_4$ tetrahedra, and/or $AlO_6$ octahedra are linked in three dimensions. Non-limiting examples of framework silicates containing both silica and alumina include feldspars such as albite, anorthite, andesine, bytownite, labradorite, microcline, sanidine, and orthoclase.

In some embodiments, the sorbent powder compositions are characterized in that they contain a major amount of calcium, preferably greater than 20% by weight based on calcium oxide, and that furthermore they contain levels of silica, and/or alumina higher than that found in commercial products such as Portland cement. In some embodiments, the sorbent compositions comprise greater than 5% by weight alumina, preferably greater than 6% by weight alumina, preferably greater than 7% by weight alumina, and preferably greater than about 8% by weight alumina.

Coal or other fuel is treated with sorbent components at rates effective to control the amount of sulfur and/or mercury released into the atmosphere upon combustion. In some embodiments, total treatment levels of the sorbent components ranges from about 0.1% to about 20% by weight, based on the weight of the coal being treated or on the rate of the coal being consumed by combustion. When the sorbent components are combined into a single composition, the component treat levels correspond to sorbent treat levels. In this way a single sorbent composition can be provided and metered or otherwise measured for addition into the coal burning system. In general, it is desirable to use a minimum amount of sorbent so as not to overload the system with excess ash, while still providing enough to have a desired effect on sulfur and/or mercury emissions. Accordingly, in some embodiments, the treatment level of sorbent ranges from about 1% to about 10% by weight and, in some embodiments, from about 1 or 2% by weight to about 10% by weight. For many coals, an addition rate of 6% by weight of powder sorbent has been found to be acceptable.

The powder sorbents containing calcium, silica, and alumina as described herein are generally effective to reduce the amount of sulfur in gases emitted from the coal burning facility. In some embodiments, for reduction of sulfur emissions, methods of the present teachings can provide calcium in the sorbent components at a molar ratio of at least 1:1, and preferably above 1:1, measured against the moles of sulfur in the fuel (such as coal) being burned. If it is desired to avoid production of excess ash, the amount of calcium delivered by way of the sorbent can be limited to, say, a maximum molar ratio of 3:1, again measured against sulfur in the coal.

In some embodiments, the amount of mercury released is also mitigated, lowered, or eliminated by use of such sorbents even without additional halogen. It is believed that the sorbents are effective at removing oxidized mercury in systems where the flame temperature is as low as 1000° F. However, in some embodiments, including some in which the flame temperature is considerably higher than 1000° F., methods of the present teachings can include treating the coal with sorbent compositions that contain a halogen compound. The use of the halogen compound along with the alkaline powder sorbent tends to reduce the amount of unoxidized mercury in the gases of combustion.

Sorbent compositions comprising a halogen compound contain one or more organic or inorganic compounds that contain a halogen. Halogens include chlorine, bromine, and iodine. Preferred halogens are bromine and iodine. The halogen compounds are sources of the halogens, especially of bromine and iodine. For bromine, sources of the halogen include various inorganic salts of bromine including bromides, bromates, and hypobromites. In some embodiments, organic bromine compounds are less preferred because of their cost or availability. However, organic sources of bromine containing a suitably high level of bromine are considered within the scope of the present teachings. Non-limiting examples of organic bromine compounds include methylene bromide, ethyl bromide, bromoform, and carbonate tetrabromide. Non-limiting inorganic sources of iodine include hypoiodites, iodates, and iodides, with iodides being preferred. Organic iodine compounds can also be used.

When the halogen compound is an inorganic substituent, it is preferably a bromine or iodine containing salt of an alkaline earth element. Exemplary alkaline earth elements include beryllium, magnesium, and calcium. Of halogen compounds, particularly preferred are bromides and iodides of alkaline earth metals such as calcium. Alkali metal bromine and iodine compounds such as bromides and iodides are effective in reducing mercury emissions. But in some embodiments, they are less preferred as they tend to cause corrosion on the boiler tubes and other steel surfaces. In some embodiments, the sorbents added into the coal burning system contain essentially no sodium salts of either bromine or iodine compounds.

In some embodiments, sorbent compositions containing halogen are provided in the form of a liquid or of a solid composition. In some embodiments, the halogen-containing composition is applied to the coal before combustion, is added to the furnace during combustion, and/or is applied into flue gases downstream of the furnace. When the halogen composition is a solid, it can further contain the calcium, silica, and alumina components described herein as the powder sorbent. Alternatively, a solid halogen composition is applied onto the coal and/or into the combustion system separately from the sorbent components comprising calcium, silica, and alumina. When it is a liquid composition it is generally applied separately.

In some embodiments, liquid mercury sorbent comprises a solution containing 5 to 60% by weight of a soluble bromine or iodine containing salt. Non-limiting examples of preferred bromine and iodine salts include calcium bromide and calcium iodide. In some embodiments, liquid sorbents contain 5-60% by weight of calcium bromide and/or calcium iodide. For efficiency of addition to the coal prior to combustion, in some embodiments, it is preferred to add mercury sorbents having as high level of bromine or iodine compound as is feasible. In some embodiments, the liquid sorbent contains 50% or more by weight of the halogen compound, such as calcium bromide or calcium iodide.

To further illustrate, some embodiments of the present teachings involve the addition of liquid mercury sorbent directly to raw or crushed coal prior to combustion. For example, mercury sorbent is added to the coal in the coal feeders. Addition of liquid mercury sorbent ranges from 0.01 to 5%. Higher treatment levels are possible, but tend to waste material, as no further benefit is achieved. Preferred treatment levels are from 0.025 to 2.5% by weight on a wet basis. The amount of solid bromide or iodide salt added by way of the liquid sorbent is of course reduced by its weight fraction in the sorbent. In some embodiments, addition of bromide or iodide compound is at a low level such as from 0.01% to 1% by weight based on the solid. When a 50% by weight solution is used, the sorbent is then added at a rate of 0.02% to 2% to achieve the low levels of addition. For example, in some embodiments, the coal is treated by a liquid sorbent at a rate of 0.02 to 1%, preferably 0.02 to 0.5% calculated assuming the calcium bromide is about 50% by weight of the sorbent. In some embodiments, approximately 1%, 0.5%, or 0.25% of liquid sorbent containing 50% calcium bromide is added onto the coal prior to combustion, the percentage being based on the weight of the coal. In some embodiments, initial treatment is started at low levels (such as 0.01% to 0.1%) and is incrementally increased until a desired (low) level of mercury emissions is achieved, based on monitoring of emissions. Similar treatment levels of halogen are used when the halogen is added as a solid or in multi-component compositions with other components such as calcium, silica, alumina, iron oxide, and so on.

When used, liquid sorbent is sprayed, dripped, or otherwise delivered onto the coal. In some embodiments, addition is made to the coal or other fuel at ambient conditions prior to entry of the fuel/sorbent composition into the furnace. For example, sorbent is added onto powdered coal prior to its injection into the furnace. Alternatively or in addition, liquid sorbent is added into the furnace during combustion and/or into the flue gases downstream of the furnace. Addition of the halogen containing mercury sorbent composition is often accompanied by a drop in the mercury levels measured in the flue gases within a minute or a few minutes; in some embodiments, the reduction of mercury is in addition to a reduction achieved by use of an alkaline powder sorbent based on calcium, silica, and alumina.

In some embodiments, the present teachings involve the addition of a halogen component (illustratively a calcium bromide solution) directly to the furnace during combustion. In some embodiments, the present teachings provides for an addition of a calcium bromide solution such as discussed above, into the gaseous stream downstream of the furnace in a zone characterized by a temperature in the range of 2700° F. to 1500° F., preferably 2200° F. to 1500° F. In various embodiments, treat levels of bromine compounds, such as calcium bromide are divided between co-, pre- and post-combustion addition in any proportion.

In some embodiments, various sorbent components are added onto coal prior to its combustion. The coal can be particulate coal, and is optionally pulverized or powdered according to conventional procedures. In a non-limiting example, the coal is pulverized so that 75% by weight of the particles passes through a 200 mesh screen (a 200 mesh screen has hole diameters of 75 μm). In some embodiments, the sorbent components are added onto the coal as a solid or as a combination of a liquid and a solid. Generally, solid sorbent compositions are in the form of a powder. If a sorbent is added as a liquid (usually as a solution of one or more bromine or iodine salts in water), in some embodiments, the coal remains wet when fed into the burner. In some embodiments, a sorbent composition is added onto the coal continuously at the coal burning facility by spraying or mixing onto the coal while it is on a conveyor, screw extruder, or other feeding apparatus. In addition or alternatively, a sorbent composition is separately mixed with the coal at the coal burning facility or at the coal producer. In some embodiments, the sorbent composition is added as a liquid or a powder to the coal as it is being fed into the burner. For example, in some embodiments, the sorbent is applied into the pulverizers that pulverize the coal prior to injection. If desired, the rate of addition of the sorbent composition is varied to achieve a desired level of mercury emissions. In some embodiments, the level of mercury in the flue gases is monitored and the level of sorbent addition adjusted up or down as required to maintain the desired mercury level.

In some embodiments, levels of mercury and/or sulfur emitted from the facility are monitored with conventional analytical equipment using industry standard detection and determination methods. In some embodiments, monitoring is conducted periodically, either manually or automatically. In a non-limiting example, mercury emissions are monitored once an hour to ensure compliance with government regulations. To illustrate, the Ontario Hydro method is used. In this known method, gases are collected for a pre-determined time, for example one hour. Mercury is precipitated from the collected gases, and the level of elemental and/or oxidized mercury is quantitated using a suitable method such as atomic absorption. Monitoring can also take more or less frequently than once an hour, depending on technical and commercial feasibility. Commercial continuous mercury monitors can be set to measure mercury and produce a number at a suitable frequency, for example once every 3 to 7 minutes. In some embodiments, the output of the mercury monitors is used to control the rate of addition of mercury sorbent. Depending on the results of monitoring, the rate of addition of the mercury sorbent is adjusted by either increasing the level of addition; decreasing it; or leaving it unchanged. To illustrate, if monitoring indicates mercury levels are higher than desired, the rate of addition of sorbent is increased until mercury levels return to a desired level. If mercury levels are at desired levels, the rate of sorbent addition can remain unchanged. Alternatively, the rate of sorbent addition can be lowered until monitoring indicates it should be increased to avoid high mercury levels. In this way, mercury emission reduction is achieved and excessive use of sorbent (with concomitant increase of ash) is avoided.

Mercury is monitored in the convective pathway at suitable locations. In some embodiments, mercury released into the atmosphere is monitored and measured on the clean side of the particulate control system. Mercury can also be monitored at a point in the convective pathway upstream of the particulate control system. Experiments show that as much as 20 to 30% of the mercury in coal is captured in the ash and not released into the atmosphere when no mercury sorbent is added. In some embodiments, addition of mercury sorbents described herein raises the amount of mercury capture to 90% or more. Mercury emissions into the atmosphere are correspondingly reduced.

In some embodiments, sorbent components or a sorbent composition is added more or less continuously to the coal before combustion, to the furnace during combustion, and/or to the convective pathway in the 1500° F. to 2700° F. zone as described above. In some embodiments, automatic feedback loops are provided between the mercury monitoring apparatus and the sorbent feed apparatus. This allows for a constant monitoring of emitted mercury and adjustment of sorbent addition rates to control the process.

In some embodiments, mercury and sulfur are monitored using industry standard methods such as those published by the American Society for Testing and Materials (ASTM) or international standards published by the International Standards Organization (ISO). An apparatus comprising an analytical instrument is preferably disposed in the convective pathway downstream of the addition points of the mercury and sulfur sorbents. In some embodiments, a mercury monitor is disposed on the clean side of the particulate control system. Alternatively or in addition, the flue gases are sampled at appropriate locations in the convective pathway without the need to install an instrument or monitoring device. In various embodiments, a measured level of mercury or sulfur is used to provide feedback signals to pumps, solenoids, sprayers, and other devices that are actuated or controlled to adjust the rate of addition of a sorbent composition into the coal burning system. Alternatively or in addition, the rate of sorbent addition can be adjusted by a human operator based on the observed levels of mercury and/or sulfur.

In some embodiments, methods of the present teachings involve a business analysis for assessing the value of various proposed control systems, including the use of sorbents to control emissions from coal burning facilities. Following the assessment, business decisions are made based on the result of the analysis.

In some embodiments, a business analysis may include an estimating procedure that can consist of five steps: (1) obtaining the facility parameters and regulatory options for a given facility; (2) roughing out the control system design; (3) sizing the control system components; (4) estimating the costs of these individual components; and (5) estimating the costs (capital and annual) of the entire system.

Regulatory options are usually specified by others (generally a regulatory authority) and are often technology driven, typically defining allowable ways to achieve a predetermined emission limit. These options range from "no control" to a requirement for the system to reach the maximum control technically achievable. The options allowed will depend, firstly, on whether the emission source is a point source such as a stack or other identifiable primary source of pollution. Stacks are normally controlled by "add-on" devices. Probably the most subjective part of a cost estimate occurs when the control system is to be installed on an existing facility. Unless the original designers had the foresight to include additional floor space and room between components for new equipment, the installation of retrofitted pollution control devices can impose an additional expense to "shoe-horn" the equipment into the right locations.

In some embodiments, total capital investment (TCI) includes all costs required to purchase equipment needed for the control system (purchased equipment costs), the costs of labor and materials for installing that equipment (direct installation costs), costs for site preparation and buildings, and certain other costs (indirect installation costs). In some embodiments, TCI also includes costs for land, working capital, and off-site facilities.

In some embodiments, direct installation costs include costs for foundations and supports, erecting and handling the equipment, electrical work, piping, insulation, and painting. Indirect installation costs include such costs as engineering costs; construction and field expenses (i.e., costs for construction supervisory personnel, office personnel, rental of temporary offices, etc.); contractor fees (for construction and engineering firms involved in the project); start-up and performance test costs (to get the control system running and to verify that it meets performance guarantees); and contingencies. Contingencies is a catch-all category that covers unforeseen costs that may arise, such as possible redesign and modification of equipment, escalation increases in cost of equipment, increases in field labor costs, and delays encountered in start-up. Contingencies are not the same thing as uncertainty and retrofit factor costs.

In a non-limiting example, the elements of total capital investment are displayed in FIG. 1. Note that the sum of the purchased equipment cost, direct and indirect installation costs, site preparation, and buildings costs comprises the "battery limits" cost. This would mainly apply to control systems installed in existing plants, though it could also apply to those systems installed in new plants when no special facilities for supporting the control system (i.e., off-site facilities) would be required. Off-site facilities include units to produce steam, electricity, and treated water; laboratory buildings; and railroad spurs, roads, and other transportation infrastructure items. Pollution control systems do not generally have off-site capital units dedicated to them since pollution control devices rarely consume energy at that level. However, it may be necessary—especially in the case of control systems installed in new plants—for extra capacity to be built into the site generating plant to service the system. Note, however, that the capital cost of a device does not include utility costs, even if the device were to require an offsite facility. Utility costs are charged to the project as operating costs at a rate which covers both the investment and operating and maintenance costs for the utility. Operating costs are discussed in greater detail below.

As FIG. 1 shows, the installation of pollution control equipment may also require land, but since most add-on control systems take up very little space (a quarter-acre or less) this cost would be relatively small. Certain control systems, such as those used for flue gas desulfurization (FGD) or selective catalytic reduction (SCR), require larger quantities of land for the equipment, chemicals storage, and waste disposal. In these cases, especially when performing a retrofit installation, space constraints can significantly influence the cost of installation and the purchase of additional land may be a significant factor in the development of the project's capital costs. However, land is not treated the same as other capital investments, since it retains its value over time. The purchase price of new land needed for a site for a pollution control device can be added to the TCI, but it must not be depreciated, since it retains its value forever. Instead, if the firm plans on dismantling the device at some future time, then the land should be either excluded from the analysis, or the value of the land should be included at the disposal point as an "income" to the project to net it out of the cash flow analysis.

Routine operation of the control does not begin until the system has been tested, balanced, and adjusted to work within its design parameters. Until then, all utilities consumed, all labor expended, and all maintenance and repairs performed are a part of the construction phase of the project and are included in the TCI in the "Start-Up" component of the Indirect Installation Costs.

In some embodiments, total Annual Cost (TAC) has three elements: direct costs (DC), indirect costs (IC), and recovery credits (RC), which are related by the following equation:

$$TAC = DC + IC - RC$$

Clearly, the basis of these costs is one year, as this period allows for seasonal variations in production (and emissions generation) and is directly usable in financial analyses. In a non-limiting example, the various annual costs and their interrelationships are displayed in FIG. 2. In some embodiments, direct costs are those that tend to be directly proportional (variable costs) or partially proportional (semi-variable costs) to some measure of productivity—generally the company's productive output but, in some embodiments, the proper metric may be the quantity of exhaust gas processed by the control system per unit time. Finally, direct and indirect annual costs can be offset by recovery credits, taken for materials or energy recovered by the control system, which may be sold, recycled to the process, or reused elsewhere at the site. An example of such credits is the by-product of controlling sulfur with an FGD. As the lime or limestone reagent reacts with the sulfur in the exhaust gas stream, it becomes transformed into CaSO4, for example, gypsum, which can be landfilled inexpensively (a direct cost) or collected and sold to wallboard manufacturers (a recovery credit). These credits can be calculated as net of any associated processing, storage, transportation, and any other costs required to make the recovered materials or energy reusable or resalable. Great care and judgment should be exercised in assigning values to recovery credits, since materials recovered may be of small quantity or of doubtful purity, resulting in their having less value than virgin material. Like direct annual costs, recovery credits are variable, in that their magnitude is directly proportional to level of production.

In some embodiments, when alternative investment opportunities exist or, when more than one pollution control device may be used, the selection of the most appropriate alternative depends on that alternative's effect on the firm's profitability. Consequently, financial analysts have created a set of tools that provide insight into the potential financial consequences associated with an investment. While no single tool works in all instances, applying several of these tools can provide the financial manager with sufficient insight for a meaningful decision to be made. Most analysts use more than one tool to make financial decisions.

The most fundamental analysis needed is that of cash flow, which formalizes the expected inflows of revenue and outflows of expenses associated with an investment alternative. Pollution control devices do not typically generate revenues, but environmental cost accountants still begin their evaluation of pollution control alternatives through cash flow analysis as a precursor to the application of other tools. The following discusses cash flow analysis and how it applies to pollution control equipment. Probably the most important tool in the analyst's arsenal is net present value (NPV) since it acts as the foundation for a number of related analyses, including benefits/cost analysis. Incomes and expenditures take place over the life of an investment (its planning horizon), the amounts and timing of which constitute the cash flows of the project. Pollution control system costing always includes expenditures but may not necessarily have incomes. For a control to be income generating, it must reduce production cost (through fewer inputs or product reformulation), or it must capture and recover a pollutant with recyclable characteristics, for example, saleable flue ash.

Pay Back

Probably the simplest form of financial analysis is the payback period analysis, which simply takes the capital cost of the investment and compares that value to the net annual revenues that investment would generate. If net annual revenues are the same every year, the revenue can simply be divided into the total capital investment to calculate the payback period. If the annual net revenues differ, then the values need to be summed sequentially until the revenue exceeds total capital investment. The payback decision rule is to select that investment with the shortest payback time.

For most pollution control devices, payback analysis may not be possible because the device does not produce revenue. However, for a limited number of devices the device may produce a saleable product that produces a revenue stream. In these cases, payback may be a limited tool and offers only the grossest of estimates with regard to relative profitability, for the following reasons. First, payback ignores the magnitude and direction of cash flows in all of the years in the planning horizon beyond the payback period. A project that paid for itself in five years and produced revenues in all years after payback would have the same payback value as one that paid back in the same time yet incurred huge losses in all subsequent years. Second, payback does not take into account the time value of money.

Net Present Value

In some embodiments, to evaluate alternative pollution control devices, the analyst must be able to compare them in a meaningful manner. Since different controls have different expected useful lives and will result in different cash flows, the first step in comparing alternatives is to normalize their returns using the principle of the time value of money. The process through which future cash flows are translated into current dollars is called present value analysis. When the cash flows involve income and expenses, it is also commonly referred to as net present value analysis. In either case, the calculation is the same: adjust the value of future money to values based on the same (generally year zero of the project), employing an appropriate interest (discount) rate and then add them together. The decision rule for NPV analysis is that projects with negative NPVs should not be undertaken; and for projects with positive NPVs, the larger the net present value, the more attractive the project.

The steps for determining NPV are well known in the art and may include the following:
  Identification of alternatives
  Determination of costs and cash flows over the life of each alternative
  Determination of an appropriate interest (discount) rate
  For each alternative: Calculate a discounting factor for each year over the life of the equipment
  For each year's cash flows, sum all incomes and expenses to determine the net cash flow for that year in nominal terms
  Multiply each years' net cash flow by the appropriate discount factor.
  Sum the discounted net cash flows to derive the net present value.
  Compare the net present values from each alternative.
  Higher net present values indicate better investment opportunities, relative to the other alternatives in the decision set.

Return on Investment

Many firms make investment decisions based upon the return on investment (ROI) of the proposed capital purchase, rather than the magnitude of its net present value. However, for most pollution control investments, ROI analysis may not provide much in the way of useful information because, like a payback analysis, it must have positive cash flows to work properly. Calculated by dividing annual net income by the investment's capital cost, results in a percentage of the investment that is returned each year. The decision rule one should apply for ROI analysis is if the resulting percentage is at least as large as some established minimum rate of return, then the investment would be worth while. However, different industries require different rates of return on investments, and even within an industry, many different rates can be found. Analysts should consult with their firm's financial officers or an industrial association to determine what percentage would apply.

Internal Rate of Return

Internal rate of return (IRR) is a special case of net present value analysis used to separate "good" investment opportunities from "bad". In fact, many trade organizations publish standard IRR rates for their particular industry. Projects with an IRR less than the industry standard should be rejected as not providing sufficient income to make them worthwhile; and projects with IRRs greater than the industry standard should be considered good investment opportunities. NPV analysis is actually a series of current values, each one associated with a different interest rate. For each interest rate chosen, the NPV of the same investment will differ, increasing from a negative NPV at very low interest rates to a positive NPV at higher rates. For each investment analyzed, the interest rate that results in a NPV of exactly zero is the investment's IRR. However, the application of IRR depends on having positive cash flows, which may limit their use in analyzing pollution control alternatives. When there are positive cash flows, IRR can provide useful information.

Cost Benefit Ratio

The benefit-cost ratio of an investment is defined as the ratio of the discounted benefits to the discounted cost, each evaluated at the same constant dollar rate, generally in year zero dollars. With benefits in the numerator of the ratio, the criterion for accepting a project on the basis of the benefit-cost ratio is whether or not the benefit-cost ratio is greater than or equal to one (i.e., benefits are greater than costs). However, as with the payback analysis and financial tools that rely on incomes, benefit cost ratios may be limited when applied to pollution control devices and evaluated from a strict financial standpoint.

Accounting Costs and Benefits

Accounting costs are those costs included in a financial statement, ledger, or other accounting record. They "account for" the transfer of funds between one entity and another. However, economic costs are a much broader cost category. While they include accounting costs, other typical economic costs when assessing pollution control devices may include external costs such as, for example, the cost incurred by others and not part of the accounting system of the firm. For example, a boiler may produce large particles of unburned or partially burned fuels such as, for example, fly ash. While the owner of the boiler pays for the cost of that fuel through higher fuel costs, it does not include the cost of cleaning that soot off of buildings and houses upwind of the plant. The owner also does not have to pay for the asthma medicine for affected people who suffer respiratory problems because of that fly ash, nor does it compensate them for the discomfort of that asthma attack. The first of these economic costs is fairly straightforward and the economic literature has many examples of how to approximate it. The second is a health issue that can also be approximated, although only after a great deal of study and analysis. The third cost, compensation for discomfort, is a psychic cost and is extremely difficult to quantify. However these and many other similar costs should be considered by the analysis when assessing the usefulness of a pollution control alternative.

Similar to economic and accounting costs, accounting benefits (revenues, avoided production costs) are a subset of economic benefits. Pollution control devices reduce pollution and their installation reduces the occurrence of these economic costs, so the analysis may include among the benefits of the device the avoided economic costs derived from the pollutant. In other words, a fly ash free building does not have to pay for cleaning—and that avoided cost is considered a benefit of the device. Similarly, not having an asthma attack is also considered a benefit of the device. When making an economic assessment of a pollution control alternative, such as a bag house for capturing fly ash before it enters the atmosphere, the analysis looks at the benefit of avoiding these economic costs.

When performing an economic assessment of a pollution control alternative, the analysis can apply economic costs and benefits to payback, net present value analysis (for benefit cost analyses or to compare to the social discount rate through ROI or IRR).

In addition to those methods and models discussed above, one skilled in the art might the following publication useful Whet et al. 1995 "Environmental Cost Accounting for Capital Budgeting" US EPA OMB#2070 0138 and Office of Air Quality and Planning, 2002 "EPA air pollution control cost manual" $6^{th}$ ed. US EPA EPA/452/B-02-001, the disclosure of which is incorporated by reference.

Advantageously, the costs associated with adoption of methods of the present teachings described herein for operating coal burning utilities are relatively low in comparison with alternatives such as installation of chemical scrubbers, bag houses, and other control equipment. The low costs generally have a favorable effect on analyses such as pay back, NPV, IRR, ROI, and others discussed above. Importantly, methods of the present teachings also lead to significant cost advantages, due to costs avoided and enhanced revenue streams. The financial benefits are obtained whether accounting is by the accrual method or on a cash basis.

Costs avoided by virtue of use of the present teachings include, but are not necessarily limited to:

Capital and other costs of installation of chemical scrubbers to remove mercury. In year one of adoption, the cash outlay is 100% of the purchase price, or less if there's a note payable. In future years, interest is paid on the note, while depreciation is taken on the asset to calculate a bottom line for tax or other purposes according to generally accepted accounting principles. According to the size of the generating facility, costs of the scrubbers can range into the hundreds of millions of dollars. Operation of the scrubbers involves maintenance, labor, and the cost of materials. Account must also be taken of down time and the costs associated with bringing the scrubbers back on-line. As well, there are normally costs associated with disposal of the mercury containing material produced by the scrubber. In some embodiments, the avoidance of these capital costs is a major benefit of the use of the methods described herein;

Costs of debt on any note taken out to pay for the equipment;

Costs of disposal of the waste ash as hazardous waste. Some conventional alternative methods of remediating mercury result in the capture of mercury in fly ash or bottom ash, just as in the current methods. However, in conventional methods the mercury is captured in the fly ash in a non-sequestered form. For example, mercury (and other heavy metals) tend to leach from such ash under acidic conditions such as in the TCLP procedure as defined by the United Sates Environmental Protection Agency. As a consequence of the high mercury content and the leaching characteristics, the ash is considered as hazardous waste. It can therefore not be used in commerce and must be handled and disposed of as a hazardous waste;

Costs of non-compliance. Depending on jurisdiction, plant operators are subject to fines and/or other costs for exceeding regulatory limits on the release of pollutants such as mercury and sulfur;

Costs of pollution credits. In certain situations, utility operators are allowed to avoid fines or criminal liability from exceeding emissions of hazardous materials such as sulfur or mercury if they purchase so-called emission credits. These are available on the open market and fluctuate in price accordingly;

Costs of ill will among the community. Utility operators that pollute the local and regional environment and global environment are subject to opposition from any number of organizations and individuals in society. The costs associated with the opposition are sometimes intangible, but are reflected in an increased cost of doing business from uncooperative or unhelpful stances adopted by local governments, unions, taxing authorities, regulatory agencies, and so on.

Moreover, adoption of methods of the present teachings leads to advantages that increase various revenue streams:

The waste ash can be sold into commerce instead of buried as a hazardous waste. The revenue generated offsets at least partially the cost of adopting the control methods;

Tax incentives for reducing pollution can be taken advantage of. As an illustration, section 45 of the United States tax code provides tax credits for the use of modified coal under certain conditions. The modified coal must be increased in value by at least 50%; there must be a change in a baseline chemical property of at least 20%, and use of the modified coal must reduced $NO_x$ and either mercury or sulfur emissions by at least 20%. By use of the current methods, financial gain is achieved by virtue of costs avoided and revenues realized. When the gains are calculated on the basis of the amount of coal being consumed to realize the gains, in some embodiments the increased value of the coal is above 50%. The baseline chemical changes are above 20%. Sulfur and mercury are reduced by over 20%, while in some embodiments reduction of $NO_x$ is seen as well. Thus the utility operator in some embodiments qualifies for the section 45 tax credits and applies the credits on its income tax return.

In addition, use of the sorbents can lead to increased output of electricity from a unit of coal consumed, which leads to increased revenue from the use of the sorbents. In some embodiments, the water temperature in the boiler tubes is increased when the methods are practiced. It is believed that components of the sorbents form a refractory-like composition on the walls of the boiler. As a result, the walls better reflect the heat generated by combustion and focus the heat on the boiler tubes, resulting in higher water temperatures. So burning the same amount of coal increases the electrical output of the boiler, or the same level of output can be maintained by burning less coal. The net financial gain is attributable to use of the methods described herein and in particular to the sorbents.

In some embodiments, improvements in operation are also seen in the reduction of fouling and/or slagging occurring during combustion, especially on the boiler tubes. Fouling involves the formation of bonded deposits on the tubes, while slagging general occurs when the deposits are molten. Use of the sorbents tends to prevent or reduce fouling and/or slagging, and/or remediate or eliminate fouling and slagging in a furnace that has been running without use of the sorbents. In various embodiments, even one foot slag deposits are removed from boiler tubes while coal is burning with sorbents that remove mercury and render the ash non-leaching and more highly cementitious. Removal of the slag deposits leads to better heat transfer to the boiler tubes and a concomitant higher boiler temperature. The higher boiler temperature leads to increased electrical output, as more steam is generated per unit time to spin the turbines. Alternatively, the amount of coal being fed can be reduced until the water temperature is maintained at the same temperature. Either way, the amount of electricity generated per unit of coal burned goes up. The value of the "extra" electricity generated by virtue of use of the sorbents also contributes to the financial advantages of adoption of the control system. Although the present teachings are not to be limited by theory, it is believed that the sorbent compositions described above provide additional or supplemental sources of silica and alumina into the coal burning process. Combustion of the coal with the added silica and alumina forms a geopolymeric matrix such as is known in cold ceramics. Although coal naturally contains small amounts of silica and/or alumina, it is believed that the amount of the materials naturally occurring in coal is normally not sufficient to provide the geopolymeric matrix upon combustion. Further, the silica and alumina naturally occurring in coal is not necessarily balanced with the natural occurring calcium in order to provide optimum sulfur and/or mercury capture and/or cementitious ash product upon combustion.

In some embodiments, the present teachings provide methods for improving the leaching quality of heavy metals such as mercury from coal. The methods involve adding sufficient silica and/or alumina to the coal to cause a geopolymer to form upon combustion. Preferably, the silica and alumina are added along with sufficient alkali powders to reduce sulfur pitting. The alkali powders tend to neutralize the silica and alumina, with formation of geopolymeric ash along with coupling silica and/or alumina to form a ceramic like matrix that reports as a stabilized ash. It may also be that the alumina and silica burning with the coal forms a refractory like mixture compound with mercury, lead, arsenic, cadmium, antimony, cobalt, copper, manganese, zinc, and/or other heavy metals. As a result, the resulting coal ash or fly ash containing heavy metals is resistant to leaching under standard conditions. As noted above, the non-leaching quality of the coal ash leads to commercial advantages because the product would no longer be considered as a hazardous material.

Although the above discussion of the present teachings used coal burning power plants as an example, those skilled in the art will appreciate that the teaching are applicable to any coal burning facilities including cement manufacture, paper production, steam generation, residential or commercial heating, and the like. The major use of coal world wide is for the generation of electricity and as such, the present teachings are applicable to coal burning facilities that generate electricity. Those skilled in the art will appreciate that slight variations or modifications to the business analysis may be necessary depending on which type of coal burning facility is being analyzed.

On Mar. 15, 2005, EPA issued the final Clean Air Mercury Rule (CAMR) for coal-based power plants. There are two essential elements of the rule. The first are performance standards limiting mercury emissions from coal-fired power plants built after Jan. 30, 2004. The second applies to coal-fired power plants regardless of when they were built and is a market-based "cap-and-trade" program, which will allow utilities to trade mercury emissions. The program establishes a two-phase "cap," or national limit, on mercury emissions. The CAMR utilizes a market-based cap-and-trade approach under section 111 of the Clean Air Act (CAA) that requires emission reductions in two phases: a cap of 38 tons in 2010, and 15 tons after 2018, for a total reduction of 70 percent from current levels. Facilities demonstrate compliance with the standard by holding one "allowance" for each ounce of mercury emitted in any given year. In the final rule, EPA has stated that regulation of nickel emissions from oil-fired plants is not "appropriate and necessary." Emissions trading is a system of establishing a cap on emissions and allowing sources (e.g., power plants) the flexibility to choose the emissions reduction plan that works best for their situation. Trading allows a source that can over-control its emissions to sell extra reduction credits to another source for which controls would be prohibitively expensive or technologically difficult to install.

Those familiar with the art acknowledge that emissions trading markets for sulfur dioxide ($SO_2$) and nitrogen oxides (NOx) have proven relatively successful to date. For example, under the US Acid Rain Program, created under the 1990 Clean Air Act Amendments, $SO_2$ sources were allowed to determine which emission reduction solutions, for example, fuel switching, control technology, or emissions trading, were most economical for each facility. This flexibility can result in greater environmental benefit at lower cost. The newer, evolving, NOx market has also reduced emissions, although prices have been more volatile.

A cap-and-trade program could provide several benefits in terms of controlling emissions. Trading programs generally provide regulated units with more flexibility to meet overall emissions reductions than do conventional command-and-control approaches because a unit may apply whichever control method it finds to be most appropriate and cost-effective to meet emission limits. This flexibility serves to minimize overall control costs in the market. Furthermore, cap-and-trade programs can provide greater environmental certainty by establishing fixed national emissions caps that cannot be exceeded. However, a cap-and-trade program's environmental benefits will depend on the adequacy of the cap.

Under EPA's proposed mercury emissions trading program, units that cannot cost-effectively reduce emissions through controls may buy allowances from units that were able to reduce emissions beyond their established allowance limits and are willing to sell their extra allowances. Each unit is required to possess one emissions allowance per each ounce of mercury it emits. Units would be allowed to buy and sell credits among one another in a national emissions market. EPA's proposed cap-and-trade alternative proposes that the interim mercury emissions cap for 2010 be based on the amount of mercury reductions achieved solely as a co-benefit through implementation of $SO_2$ and NOx controls under the proposed Clean Air Interstate Rule (CAIR).

In some embodiments, the present teachings provide methods for lowering mercury emissions from a coal burning facility as described above. In some embodiments, the present teachings provide methods for meeting emission limits for mercury as determined by a regulatory body or governmental agency. In some embodiments, the present teaching provide methods for trading emission credits created by use of at least of sorbent discussed above. In some embodiments, the emission trading credits can appear on a financial statement and such financial statements are discussed above. In some embodiments, an emission credit can be used as an asset or provide profit to an operator with a profit.

EXAMPLES

Example 1

Coal is burned in a positive draft tangentially fired boiler to generate electricity for consumer use. Powdered coal (75% passing 200 mesh) is fed to the boiler. Before introduction of the powdered coal into the boiler, a powder sorbent is added to the coal at a rate of 6% by weight, based on the rate of coal being consumed by combustion. The powder sorbent contains 93% by weight of a 50/50 mixture of cement kiln dust and lime kiln dust, and 7% by weight of calcium montmorillonite. At the same time, a 50% by weight solution of calcium bromide in water is dripped onto the coal at a rate of 0.1 to 2% by weight based on the rate of consumption of coal by combustion. Fly ash samples are collected before addition of sorbents (baseline), and after addition of the powder and liquid sorbents. The levels of chlorine and heavy metals are determined according to standard methods. Results are in Table 1.

TABLE 1

Fly Ash Composition with and without sorbents

| Element | Test—After sorbent addition (ppm except for chlorine) | Baseline—Prior to sorbent addition (ppm except for chlorine) |
| --- | --- | --- |
| Arsenic | 59.3 | 26.5 |
| Barium | 1.3 | 1.4 |
| Cadmium | 2.3 | 1.1 |
| Cobalt | 44.8 | 38.5 |
| Chromium | 52.0 | 34.3 |
| Copper | 61.0 | 48.8 |
| Manganese | 455.7 | 395.5 |
| Molybdenum | 26.0 | 31.5 |
| Nickel | 208.5 | 325.5 |
| Lead | 45.8 | 31.3 |
| Antimony | 23.0 | 7.3 |
| Vanadium | 473.0 | 874.5 |
| Zinc | 3954.0 | 974.7 |
| Mercury | 0.246 | 0.128 |
| Chlorine | 0.940% | 0.56% |

Example 2

Next the ash samples are tested according to the TCLP procedure of the EPA, as described above, to determine the acid leaching thresholds of key elements. Results are in Table 2.

TABLE 2

Fly Ash TCLP Test Results

| Element | EPA Threshold Limit (ppm) | Baseline—prior to sorbent addition (ppm) | Test—with sorbent addition (ppm) |
| --- | --- | --- | --- |
| Arsenic | 5.00 | <0.04 | <0.04 |
| Barium | 100.00 | 0.814 | 0.313 |
| Cadmium | 1.00 | <0.04 | <0.04 |
| Chromium | 5.00 | 0.030 | <0.007 |
| Lead | 5.00 | 0.513 | 0.096 |
| Mercury | 0.20 | 0.095 | 0.078 |
| Selenium | 1.00 | <0.07 | <0.07 |
| Silver | 5.00 | 3.835 | 3.291 |

It is seen in these non-limiting Examples that use of the sorbents increases the level of several heavy metals found in the fly ash. For example, arsenic, cadmium, chromium, lead, mercury, and chlorine are present at higher levels in the test ash than in the baseline. This is believed to represent increased capture of these exemplary elements in the ash. The increased level of zinc in the test ash is unexplained. However, it could be due to the fact that a great deal of de-slagging is observed from the boiler tubes upon use of sorbents of the present teachings. It could be that the increased levels of zinc are attributable to material removed from the boiler tubes during combustion with the sorbents.

Table 2 shows that, while the fly ash is higher in absolute levels of elements such as arsenic, lead, and mercury, nevertheless the amount of leachable arsenic, lead, and mercury is actually lower in the test fly ash than in the baseline.

All literature and similar materials cited in this application, including but not limited to, patents, patent applications, articles, books, treatises, and internet web pages, regardless of the format of such literature and similar materials, are expressly incorporated herein by reference in their entirety for any purpose. In the event that one or more of the incorporated literature and similar materials differs from or contradicts this application, including but not limited to defined terms, term usage, described techniques, or the like, this application controls.

Some embodiments and the examples described herein are exemplary and not intended to be limiting in describing the full scope of compositions and methods of these teachings. Equivalent changes, modifications and variations of some embodiments, materials, compositions and methods can be made within the scope of the present teachings, with substantially similar results.

What is claimed is:

1. A method of increasing the value of coal burned in a coal burning facility, the method comprising:
   combusting coal containing mercury in the presence of at least one sorbent to produce heat energy, ash, and flue gases, said ash containing at least 90% by weight of the mercury originally present in the coal, said ash having a concentration of acid leachable mercury that is less than a concentration of acid leachable mercury in an ash produced by combusting the coal without the at least one sorbent;
   monitoring said flue gases for said mercury and adjusting the presence of the at least one sorbent to achieve a desired mercury emission to comply with an environmental regulation; and
   realizing a monetary savings by an avoidance of disposal costs of said fly ash produced.

2. The method according to claim 1 further comprising reflecting said monetary savings on one or more financial statements.

3. The method according to claim 2, wherein said financial statements are at least one of a tax return, a balance sheet, a cash flow analysis, a shareholder equity statement, and an income statement.

4. The method according to claim 1 further comprising calculating a net savings per unit of coal burned.

5. The method according to claim 4 further comprising offsetting a cost of at least one of said coal and said at least one sorbent with a said net savings per unit of coal burned.

6. The method according to claim 1, wherein said monetary savings from said presence of said at least one sorbent increases the value of said coal that is combusted by at least 50%.

7. The method according to claim 1, wherein said monetary savings from said presence of said at least one sorbent is greater than a cost of said presence of said at least one sorbent.

8. The method according to claim 1, wherein said at least one sorbent comprises at least one of CaO, $SiO_2$, $Al_2O_3$, $Fe_2O_3$, $Na_2O$, and $K_2O$.

9. The method according to claim 1, wherein said coal burning facility is an electric utility plant.

10. The method according to claim 1, wherein said coal burning facility is a cement plant.

11. The method according to claim 1 further comprising creating mercury emissions trading credits.

12. A method of operating a coal burning facility comprising:
   combusting coal in a furnace and in the presence of a sorbent composition; and
   generating energy by the combusting coal;
   wherein said sorbent composition is at least one of added onto said coal prior to said combusting, applied into said furnace during said combusting and applied into flue gases downstream of said furnace,
   wherein said presence of said sorbent composition reduces emissions of at least one of mercury and sulfur compared to combusting coal without said sorbent composition, and
   wherein said presence of said sorbent composition produces a coal ash more cementitious in nature compared to a coal ash produced from combusting coal without said presence of said sorbent composition.

13. The method according to claim 12 further comprising selling said energy.

14. The method according to claim 13, wherein said energy is electricity.

15. The method according to claim 12, wherein said combusting coal in said presence of said sorbent composition increases a power generation per unit of coal burned as compared to combusting coal without said presence of said sorbent composition.

16. The method according to claim 12, wherein said sorbent composition comprises at least one of CaO, $SiO_2$, $Al_2O_3$, $Fe_2O_3$, $Na_2O$, and $K_2O$.

17. The method according to claim 12 further comprising using said energy in the production of cement.

18. A method of operating a coal plant to produce energy and waste ash, the method comprising:
   burning coal in the presence of a sorbent composition to produce a waste ash with a reduced concentration of acid leachable mercury when compared to the concentration of acid leachable mercury in the waste ash produced from burning coal without the sorbent composition;
   recovering the waste ash having a reduced concentration of acid leachable mercury; and
   mixing it with cementitious powder to make a cement product.

19. The method according to claim 18 further comprising selling said cement product into a commercial market.

20. The method according to claim 18, wherein said cementitious powder is at least one of a Portland cement, a pozzolan material, a slag, and a cement kiln dust.

21. The method according to claim 18 further comprising creating mercury emissions trading credits.

22. The method according to claim 18, wherein said sorbent composition comprises at least one of CaO, $SiO_2$, $Al_2O_3$, $Fe_2O_3$, $Na_2O$, and $K_2O$.

23. A method of operating a coal burning plant to produce heat energy and fly ash, the method comprising:
   burning coal in the presence of at least one sorbent that increases a concentration of a heavy metal in the fly ash and that decreases a concentration of acid leachable heavy metal in the fly ash when compared to the concentration of heavy metal and the concentration of acid leachable heavy metal in the fly ash produce by burning the coal without said at least one sorbent; and
   selling said fly ash as an industrial raw material.

24. The method according to claim 23 further comprising producing electricity.

25. The method according to claim 24 further comprising selling said electricity.

26. The method according to claim 23 further comprising using said heat energy in producing cement.

27. The method according to claim 26 further comprising selling said cement.

28. The method according to claim 23, wherein said at least one sorbent comprises at least one of CaO, $SiO_2$, $Al_2O_3$, $Fe_2O_3$, $Na_2O$, and $K_2O$.

* * * * *

UNITED STATES PATENT AND TRADEMARK OFFICE
CERTIFICATE OF CORRECTION

PATENT NO. : 8,150,776 B2
APPLICATION NO. : 11/652249
DATED : April 3, 2012
INVENTOR(S) : Douglas C. Comrie It is certified that error appears in the above-identified patent and that said Letters Patent is hereby corrected as shown below:

Col. 2, line 13, replace "provides" with --provide--

Col. 2, line 52, replace "herein;" with --herein.--

Col. 4, line 54, replace "provides" with --provide--

Col. 12, line 61, replace "$CaCO_3.MgCO_3$" with --$CaCO_3 \cdot MgCO_3$--

Col. 13, line 65, replace "2%" with --20%--

Col. 14, line 52, replace "$SiO_2.Al_2O_3$" with --$SiO_2 \cdot Al_2O_3$--

Col. 14, line 56, replace "$SiO_2.Al_2O_3$" with --$SiO_2 \cdot Al_2O$--

Col. 24, line 5, after "might" insert --find--

Col. 24, line 5, after "useful" insert a --;--

Col. 24, line 52, replace "Sates" with --States--

Col. 27, line 47, after "least" delete "of"

Col. 30, line 50, claim 23, replace "produce" with --produced--

Signed and Sealed this
Second Day of October, 2012

David J. Kappos
*Director of the United States Patent and Trademark Office*